(12) United States Patent
Crofford

(10) Patent No.: US 9,858,774 B1
(45) Date of Patent: Jan. 2, 2018

(54) HAPTIC DEVICE CAPABLE OF MANAGING DISTRIBUTED FORCE

(71) Applicant: Jonathan M. Crofford, Dallas, TX (US)

(72) Inventor: Jonathan M. Crofford, Dallas, TX (US)

(*) Notice: Subject to any disclaimer, the term of this patent is extended or adjusted under 35 U.S.C. 154(b) by 0 days.

(21) Appl. No.: 14/859,873

(22) Filed: Sep. 21, 2015

Related U.S. Application Data

(63) Continuation-in-part of application No. 13/907,556, filed on May 31, 2013, now Pat. No. 9,142,105.

(60) Provisional application No. 61/654,305, filed on Jun. 1, 2012.

(51) Int. Cl.
*H04B 3/36* (2006.01)
*G08B 6/00* (2006.01)

(52) U.S. Cl.
CPC ..................................... *G08B 6/00* (2013.01)

(58) Field of Classification Search
None
See application file for complete search history.

(56) References Cited

U.S. PATENT DOCUMENTS

| | | | |
|---|---|---|---|
| 3,400,478 A | 9/1968 | O'Keefe | |
| 3,530,606 A | 9/1970 | O'Keefe | |
| 3,568,357 A | 3/1971 | Lebensfeld | |
| 3,919,691 A | 11/1975 | Noll | |
| 3,949,392 A | 4/1976 | Caritato | |
| 4,148,645 A | 4/1979 | Gates | |
| 4,191,945 A | 3/1980 | Hannen et al. | |
| 4,283,178 A | 8/1981 | Tetzlaff | |
| 4,654,989 A | 4/1987 | Fleming | |
| 4,871,992 A | 10/1989 | Petersen | |
| 5,086,287 A | 2/1992 | Nutzel | |
| 5,717,423 A | 2/1998 | Parker | |
| 5,793,918 A | 8/1998 | Hogan | |
| 6,109,922 A | 8/2000 | Litschel et al. | |
| 6,189,246 B1 | 2/2001 | Gorthala | |
| 6,298,587 B1 | 10/2001 | Vollom | |
| 6,337,678 B1 | 1/2002 | Fish | |
| 6,462,840 B1 * | 10/2002 | Kravtsov | G09F 9/33 345/427 |
| 6,535,201 B1 | 3/2003 | Cooper et al. | |
| 6,625,088 B1 | 9/2003 | Mah et al. | |
| 6,734,785 B2 | 5/2004 | Petersen | |
| 6,819,228 B2 * | 11/2004 | Gipson | G09B 21/004 340/407.1 |

(Continued)

FOREIGN PATENT DOCUMENTS

GB 2463012 A 3/2010

*Primary Examiner* — Julie Lieu
(74) *Attorney, Agent, or Firm* — Carrington, Coleman, Sloman & Blumenthal, L.L.P.

(57) ABSTRACT

A haptic device operated alone or interacts with other physical or virtual devices of similar design that enable users to remotely image, analyze, or manipulate objects, either manually and or with the assistance of computer programs. The device extends and retracts "pins" in reaction to messages from a processor, and to external pressure applied to the pins' topical surface. A support structure provides a constant geometric plane. An operating system is provided that is capable of interaction for any one of a collection of devices of varying size and function. Multiple devices that are paired or otherwise positioned relative to one another, or scaled in size relative to one another, can be controlled to operate in cooperation with one another.

21 Claims, 17 Drawing Sheets

(56) References Cited

U.S. PATENT DOCUMENTS

| | | | |
|---|---|---|---|
| 6,860,784 B2 | 3/2005 | Chernov et al. | |
| 6,903,871 B2 | 6/2005 | Page | |
| 7,019,898 B2 | 3/2006 | Page | |
| 7,113,177 B2 | 9/2006 | Franzen | |
| 7,161,559 B2 | 1/2007 | Fan | |
| 7,277,080 B2 | 10/2007 | Goulthorpe | |
| 7,311,512 B2 | 12/2007 | Yanagisawa et al. | |
| 7,336,266 B2 * | 2/2008 | Hayward | G06F 3/03547 178/18.05 |
| 7,382,357 B2 | 6/2008 | Panotopoulos et al. | |
| 7,436,388 B2 * | 10/2008 | Hillis | G09F 9/372 345/108 |
| 7,439,950 B2 | 10/2008 | Carlberg | |
| 7,538,764 B2 | 5/2009 | Salomie | |
| 7,737,828 B2 | 6/2010 | Yang et al. | |
| 7,755,602 B2 * | 7/2010 | Tremblay | G06F 3/011 345/156 |
| 7,889,170 B2 | 2/2011 | Suzuki et al. | |
| 8,740,618 B2 * | 6/2014 | Shaw | G09B 21/003 116/17 |
| 2002/0044132 A1 * | 4/2002 | Fish | G06F 3/016 345/156 |
| 2005/0158695 A1 * | 7/2005 | Takahashi | G09B 21/004 434/113 |
| 2007/0229469 A1 | 10/2007 | Seguine | |
| 2009/0184923 A1 * | 7/2009 | Schena | G01D 7/007 345/156 |
| 2009/0250267 A1 * | 10/2009 | Heubel | G06F 3/041 178/18.03 |
| 2009/0273109 A1 | 11/2009 | Johnson et al. | |
| 2012/0302293 A1 * | 11/2012 | Johnson | B06B 1/045 455/567 |

\* cited by examiner

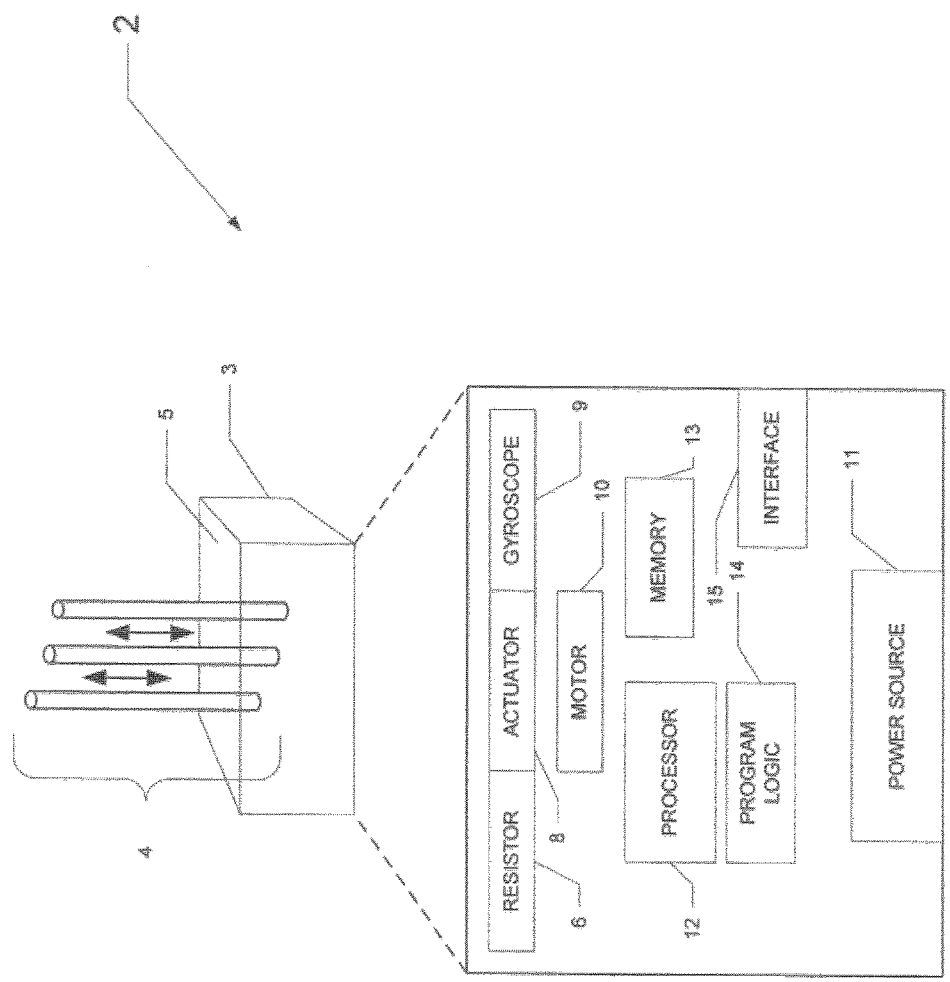

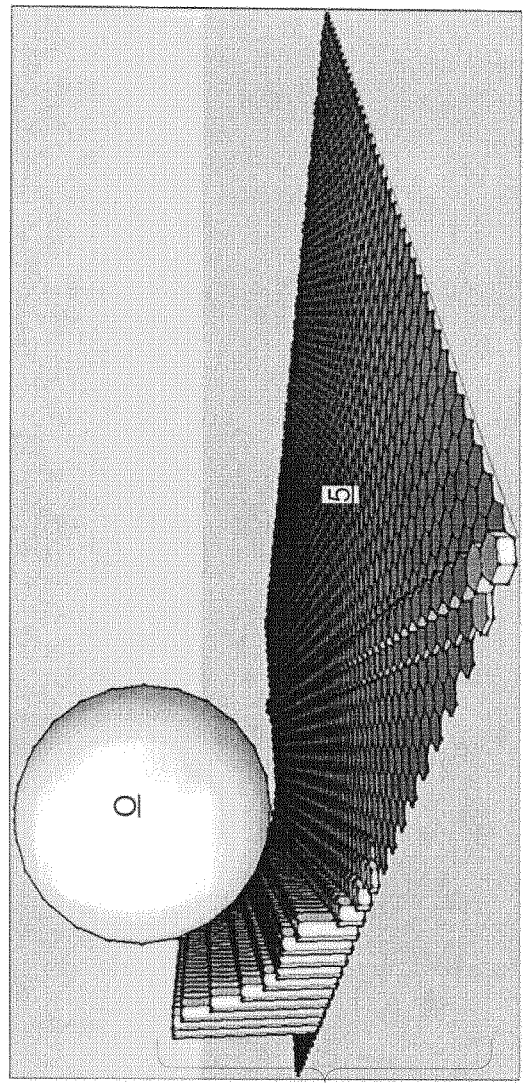

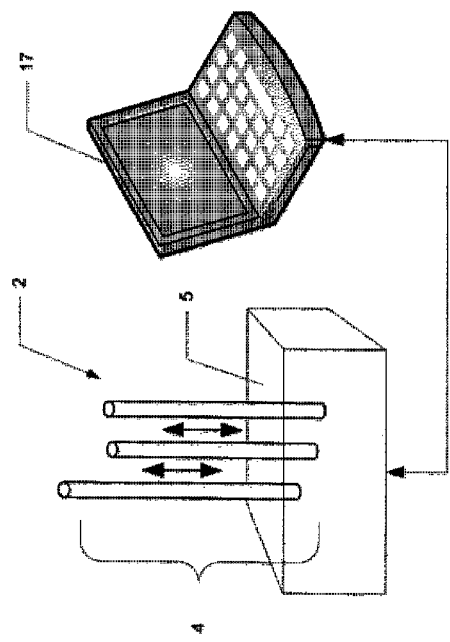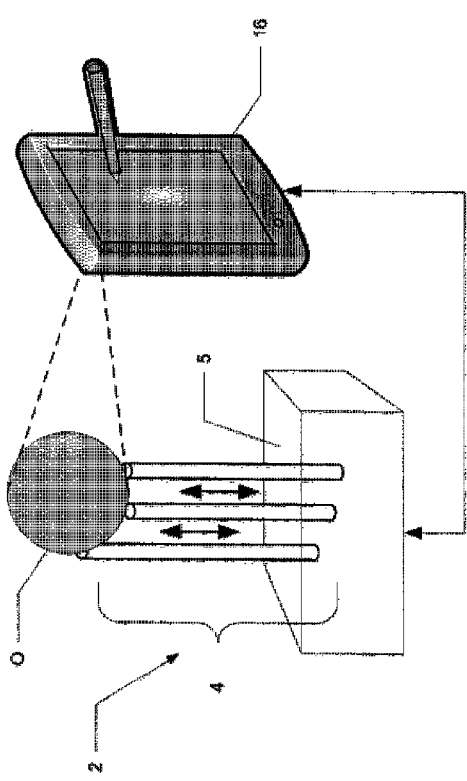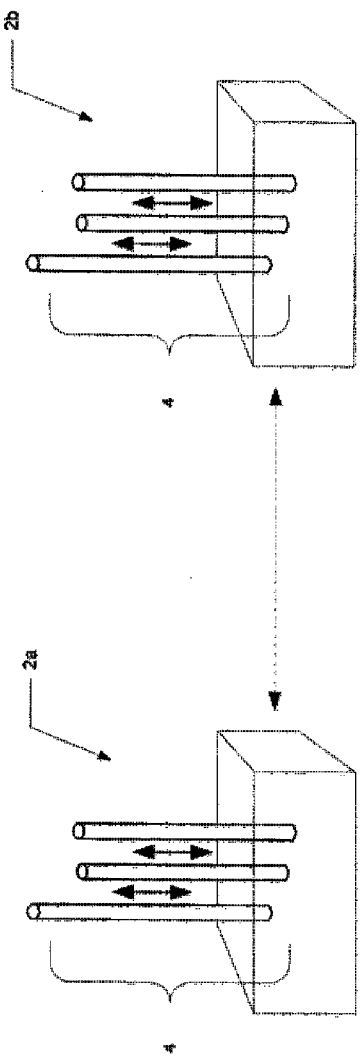
Fig. 2a
Fig. 2b
Fig. 2c

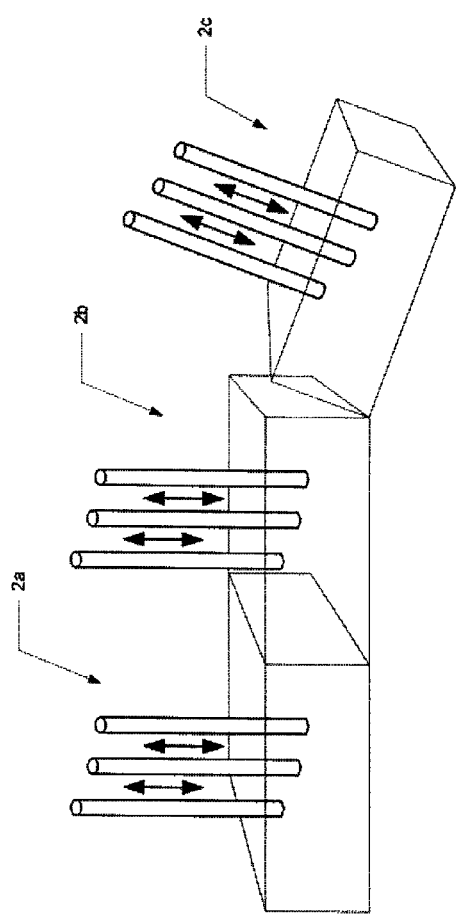
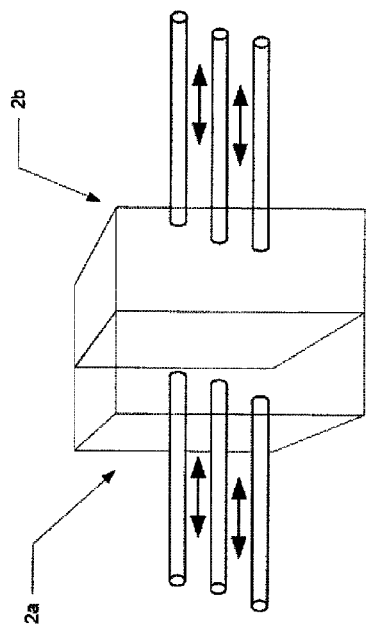
Fig. 3a
Fig. 3b

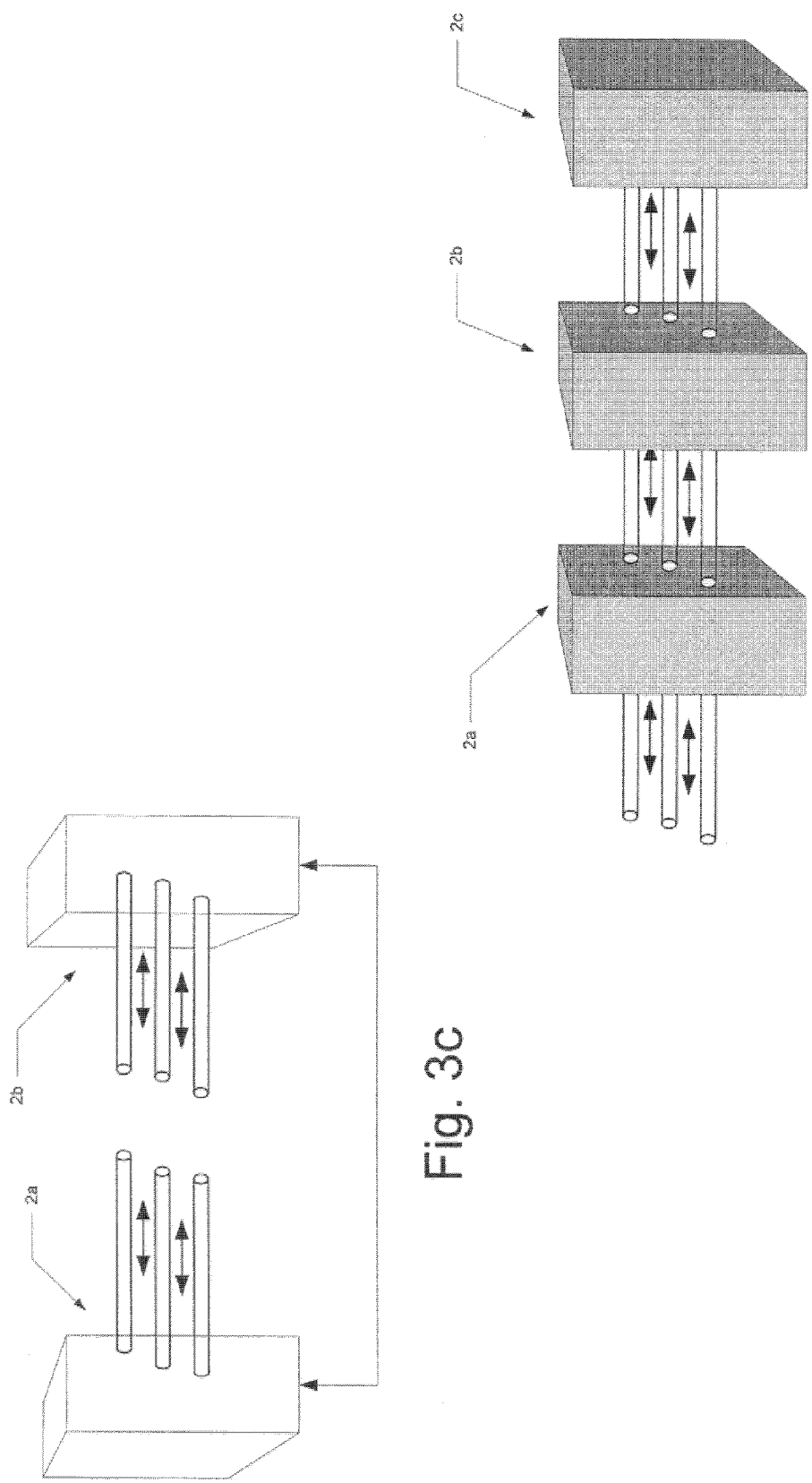

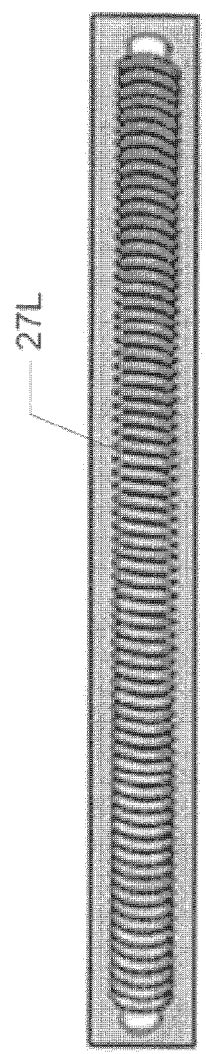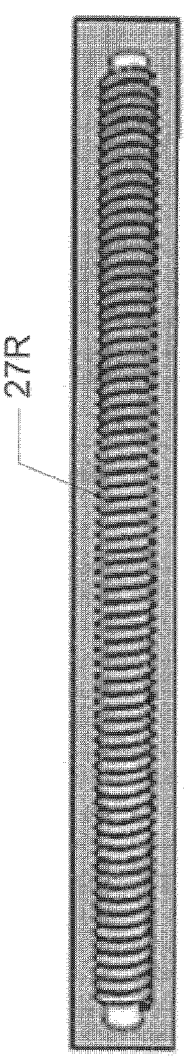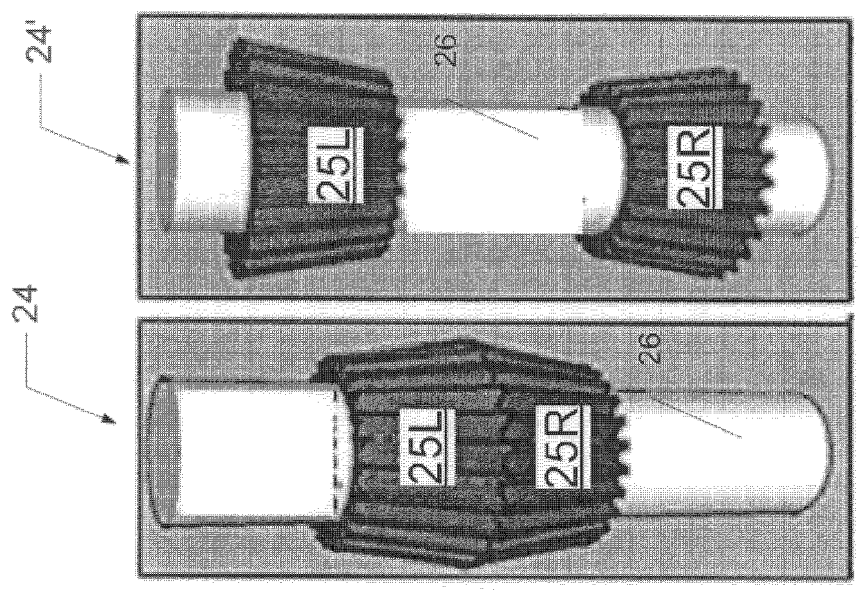

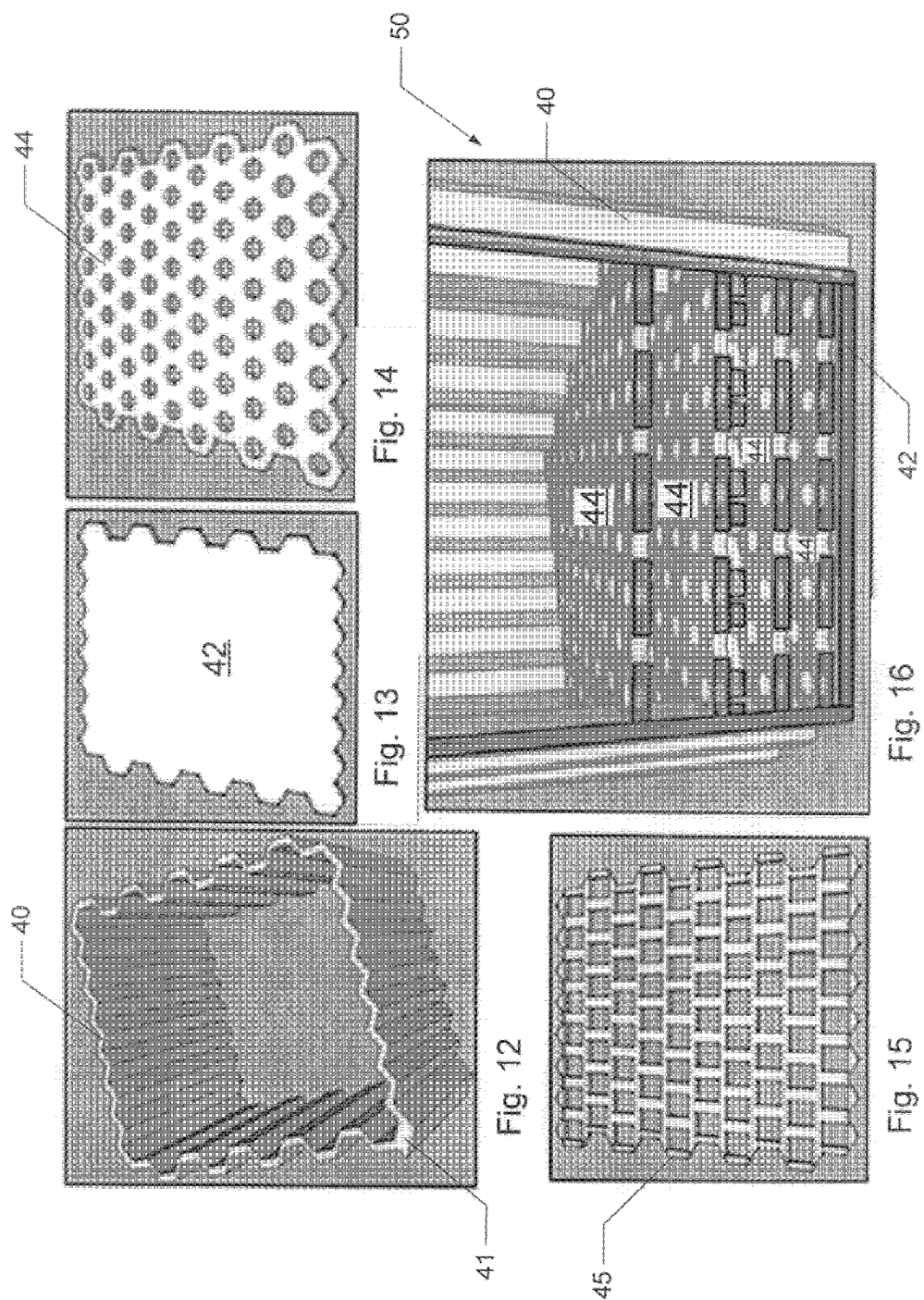

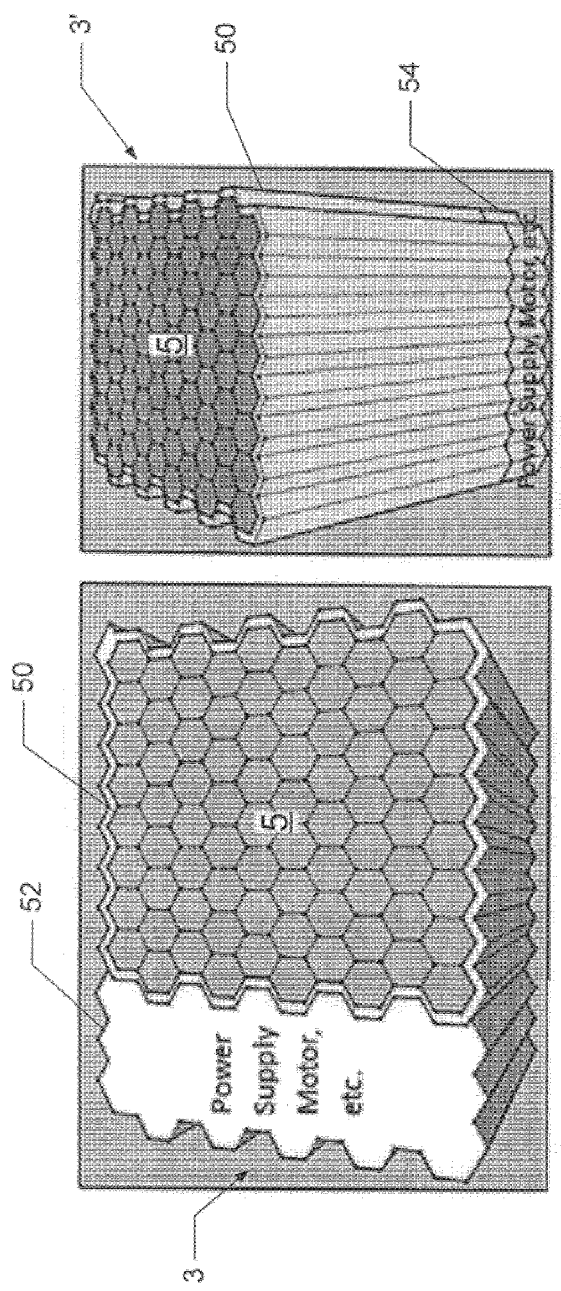
Fig. 17
Fig. 18
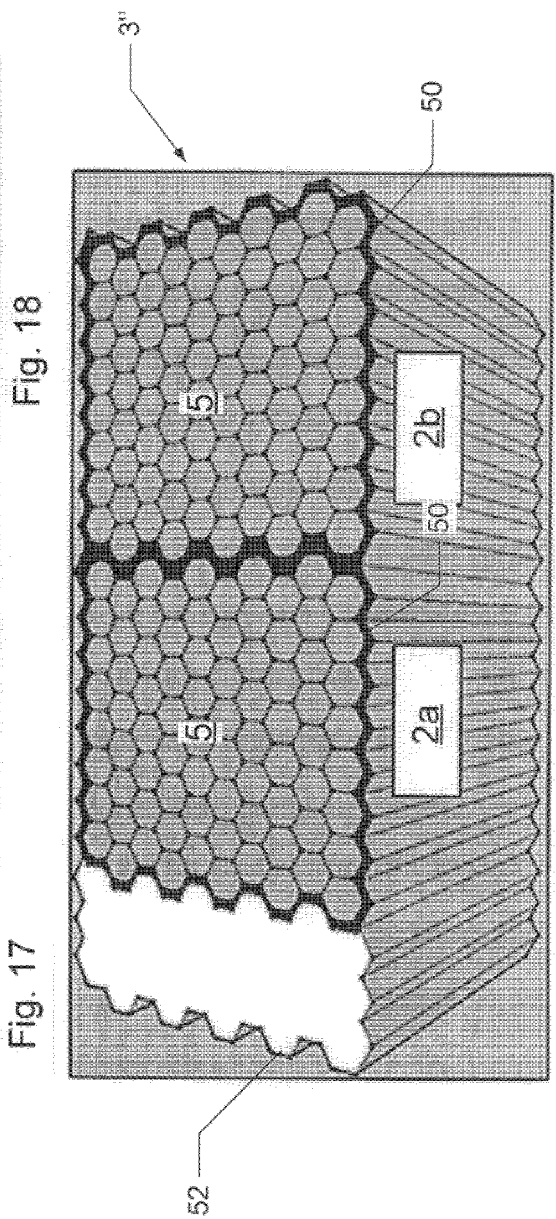
Fig. 19

HAPTIC DEVICE CAPABLE OF MANAGING DISTRIBUTED FORCE

CROSS-REFERENCE TO RELATED APPLICATIONS

This application is a continuation-in-part of copending application Ser. No. 13/907,556, filed May 31, 2013, which claims priority, under 35 U.S.C. §119(e), of Provisional Application No. 61/654,305, filed Jun. 1, 2012, and incorporated herein by this reference.

STATEMENT REGARDING FEDERALLY SPONSORED RESEARCH OR DEVELOPMENT

Not applicable.

BACKGROUND OF THE INVENTION

This invention is in the field of haptic devices. Embodiments of the invention are more specifically directed to remote force management by operation of one or more haptic devices.

Conventional computer systems typically interface with their users, and with the "outside world" in general, by way of graphics and text. Even pointing devices (e.g., mouse, trackball, trackpad) operate in a graphical sense, by navigating a cursor among graphical elements. In the industrial context, additional interface approaches include the receiving of inputs from sensors and transducers, and the outputting of motor control signals in either of the digital and analog domains.

Haptic devices refer to those interface devices by way of which computers and computer systems mechanically interface with users or objects, by applying forces, vibrations, or motions from the device to the user or object. Examples of conventional haptic devices include robotic devices for handling or moving an object, for example as controlled by a haptic input device receiving motion inputs from a human user, vibrators in game controllers and other devices for issuing a sensation to the user at the appropriate times in a game or simulator, virtual reality systems by way of which user motion is directly interpreted as inputs, and by way of which the haptic device can receive physical feedback, and the like.

Conventional haptic devices operate according to a variety of mechanisms. A common type of haptic device includes actuators that cause mechanical motion in response to a signal stimulus. Conventional haptic input mechanisms include electroactive polymers for sensing the touch of a user, and actuators including piezoelectric, electrostatic, and subsonic audio wave elements for transducing touch or pressure to an electrical signal.

It is contemplated that multiple conventional haptic devices may operate in conjunction with one another by way of a shared motor mechanism, such as a lever. However, this shared motor mechanism necessarily enforces a practical limit as to how remote the devices can be from one another, and as to the response of the devices to one another.

BRIEF SUMMARY OF THE INVENTION

Embodiments of the invention may be implemented by way of a motorized device, having a structural support for a plurality of pins. The distal ends of the pins define a surface from which the pins can extend. The device includes motors that are selectably coupled to the pins by way of one or more actuators. The motors operate to extend or retract the pins, or to hold the pins in place, under the control of the actuators. The actuators are coupled to a processor. In some embodiments, the processor issues signals to the actuators to extend, retract, or hold the pins. In other embodiments, the processor receives a signal from the actuators corresponding to external pressure applied against the pins.

BRIEF DESCRIPTION OF THE SEVERAL VIEWS OF THE DRAWING

FIG. 1a is a block diagram illustrating the construction and functionality of a haptic device according to embodiments of the invention.

FIG. 1b is a perspective view of the pin surface of the device of FIG. 1a.

FIGS. 2a through 2c are functional diagrams illustrating various implementations of the device according to embodiments of the invention.

FIGS. 3a through 3d are functional diagrams illustrating various pairing configurations of multiple devices according to embodiments of the invention.

FIGS. 6a through 6d are perspective views of the construction of pin worm gears and worms in the device according to embodiments of the invention.

FIG. 12 is a perspective view of the siding of a pin casing in a device constructed according to embodiments of the invention.

FIG. 13 is a perspective view of a bottom plate of a pin casing in a device constructed according to embodiments of the invention.

FIG. 14 is a perspective view of an interior platform of a pin casing in a device constructed according to embodiments of the invention.

FIG. 15 is a perspective view of another interior platform of a pin casing in a device constructed according to embodiments of the invention.

FIG. 16 is a cutaway perspective view of a constructed pin casing in a device constructed according to embodiments of the invention.

FIG. 17 is a perspective view of an arrangement of an enclosure in a device constructed according to embodiments of the invention.

FIG. 18 is a perspective view of another arrangement of an enclosure in a device constructed according to embodiments of the invention.

FIG. 19 is a perspective view of another arrangement of an enclosure of paired devices constructed according to embodiments of the invention.

DETAILED DESCRIPTION OF THE INVENTION

Figure 4A:
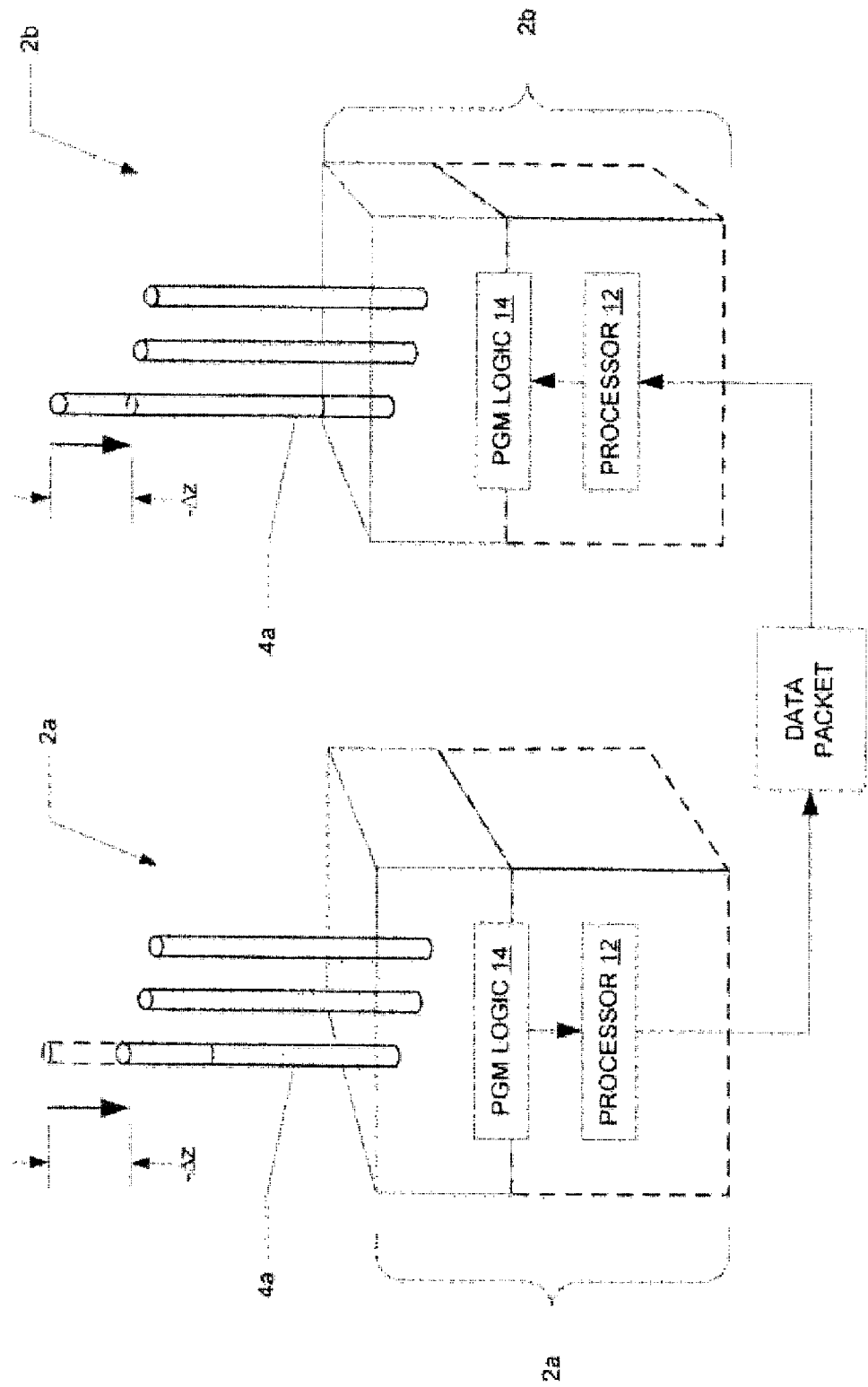
FIGS. 4a and 4b are block and functional diagrams illustrating communications between paired devices according to embodiments of the invention.

This invention will be described in connection with various ones of its embodiments. It is to be understood that those embodiments and the remainder of the following description are provided by way of example only, and are not intended to limit the true scope of this invention as claimed.

FIG. 1a illustrates, in functional block diagram form, the construction of haptic device 2 according to embodiments of the invention. In a general sense, enclosure 3 supports multiple pins 4, each of which is movable along its axis as suggested by the arrows in FIG. 1a. According to embodiments of this invention, the distal surfaces of pins 4 defines a surface, which is typically planar with all pins 4 refracted to a nominal position, and from which one or more of pins 4 can extend. Three pins 4 are shown in FIG. 1a for the sake of clarity but, as will be described below, it is contemplated that the number of pins 4 typically used will be in the tens or hundreds, with pins 4 typically arranged in an array (i.e., rows and columns). FIG. 1b illustrates, in a perspective view, an array of a large number (e.g., on the order of nine hundred) pins 4 defining surface 5, from which some pins 4 are extend along their axes from the nominal pad surface 5 to apply a force on object O. According to embodiments of this invention, pins 4 are arranged to operate in a common, consistent, and predictable method from the geometric plane of surface 5. The particulars of the form of pins 4 need not necessarily be the same above and below surface 5. For example, pins 4 may be implemented by a pin shell that is lifted or even inflated to extend relative to surface 5.

The details of the construction of haptic device 2, according to its embodiments, will be described in detail in this specification. In a general sense, however, enclosure 3 frames and supports pins 4, and ensures a predictable geometric plane of reference of surface 5. Enclosure 3 thus prevents significant deformation of haptic device 2, ensuring a predictable pad surface from which pins 4 extend and retract. Enclosure 3 also defines a volume within which mechanical components are provided for extending or refracting pins 4 relative to surface 5, or holding pins 4 in a fixed position. These components include actuators 8 associated with pins 4, either in a one-to-one association or otherwise, and that engage enabling components that extend, hold, or retract pins 4. One or more motors 10 are provided to effect the extending, refracting, or holding of pins 4. In some embodiments, as will be described in detail below, actuators are provided to selectably couple individual pins 4 to motor or motors 10 in order to extend, retract, or hold the pins. In other embodiments, it is contemplated that this actuation may be effected by selectably energizing the motor or motors 10 to extend, retract, or hold the corresponding pins 4. It is contemplated that a single motor or motor system 10 may provide the motive force for all pins 4 of haptic device 2, or if multiple motors 10 are provided, each motor 10 may provide the motive force for a subset of pins 4 of haptic device 2. In particular, haptic device 2 may be constructed with a plurality of motors 10 such that each motor 10 is associated with a single one of pins 4. Resistors 6 are provided to apply resistance to the movement of pins 4 in response to external pressure, for example by establishing a threshold of counter pressure that stops the extension of pins 4, or initiates retraction of pins 4. Gyroscope 9 provides spatial reference information to determine the orientation of the plane of surface 5, as will be described in further detail below.

According to embodiments of this invention, motor 10, actuators 8, resistors 6, and other components operate under the control of processor 12. Processor 12 may be a conventional microprocessor or microcontroller, that issues programmed logic commands, records and communicates changes in the position of pins 4, and otherwise executes instructions in combination with memory 13. Program logic 14 refers to program instructions or hard-wired logic, or both, for controlling the various components of haptic device 2, and its communication with other haptic devices, external computers, etc. Power source 11 is also provided in haptic device 2 to receive and distribute the necessary electrical power among these components. Interface 15 is also provided to allow processor 12 and haptic device 2 to communicate wirelessly, by hard-wiring, or by way of a wired network, with other system components, including other haptic devices (including other instances of haptic device 2), a host computer, other computers in a distributed network or over a wide area network such as the Internet.

Any or all of power source 11, processor 12, memory 13, program logic 14, and interface 15 may be housed within enclosure 3, or may be housed separately from actuators 8 and motor 10, or may be shared among multiple haptic devices 2. In a more general sense, it is contemplated that various components of haptic devices 2 can be shared, removed, and/or deactivated over time, depending on the application, such components including pins 4, motors 10, resistors 6, actuators, enclosure 3 and its various components, power source 11, processor 12, memory 13, and program logic 14, and interface 15.

It is contemplated that processor 12 and program logic 14 of haptic device 2 (hereinafter referred to as "pad" 2) will operate according to pad data that are created and processed in a sequence of time intervals. According to some embodiments of the invention, these pad data can include such fields and values as:

Pad Id—unique identifier to differentiate pads.
Interval Id—unique identifier for a collection of pad data.
Interval Date/Timestamp—date and time that a collection of pad data is captured. Length of an interval is equal to the amount of time it takes a pin to extend or retract a Pin Increment.
Pad Border Width—thickness of support casing, i.e., pin edge to outside border of pad.
Pad Height—distance from bottom of pad base to fully retracted pin surface.
Pad Plane Orientation—relative position of pad to known geometric plane.
Pin Id—unique identifier by pad.
Pin Arrangement*—pin location on pad identified by row and column or a pad layout that can be mapped to such an arrangement, i.e., missing pin has a null value.

Pin Increment*—amount a pin is extended or retracted during an interval. This amount is based on a percent of Pin Max Extended Height and remains constant during pad operation.

Pin Extension Force*—value to describe pin extension pressure, e.g., pounds per square inch.

Pin Extension Range*—range a pin can move between pad surface and Max Extended Height.

Pin Max Extended Height*—distance from pad surface to top of fully extended pin.

Pin Position*—most recent value of pin within the Pin Extension Range, e.g., 3 of 10.

Pin Rate of Extension*—a velocity value that describes the rate at which the pin extends.

Pin Rate of Retraction*—a velocity value that describes the rate at which the pin refracts.

Pin Resistance Level*—amount of counter pressure that stops extension or causes refraction.

Examples of optional or advanced data include:

Pin Diameter*—length of straight line through center and terminating at the periphery.

Pin Surface Area*—the amount of space of the pin's topical boundary.

Pin Surface Gap*—amount of unmanaged space around a pin's surface, e.g., zero for hexagon pins since they fit tightly together Pin Surface Orientation*—yes/no value to identify if pad surface is equal to pad's plane Pin Surface Shape*—select from standard values or n/a Pin Surface Viscosity—defined as high, medium, low

*Much of these data values can be acquired from a "control pad" positioned face to face with pad 2, or may be preset values based on the design of pins 4 and pad 2.

In some embodiments, an initial interval of pad data is captured by processor 12 and stored in memory 13 upon pad 2 being turned on or rebooted. Additional intervals of changed data are captured and stored to manage activity of pad components, e.g., counter pressure causing pin retraction, GPS data updates. These pad data may be captured periodically, for example in a polled manner; alternatively, these pad data may be asynchronously acquired, for example as interrupts to processor 12. If connected to an external computing device or to storage media, the history of pad intervals may be stored outside of memory 13. It is contemplated that processor 12 will use program logic 14 and the pad data acquired over multiple intervals to manage pin extension and retraction.

Pad 2 according to embodiments of this invention implement the concept of remote and distributed force management, as will be apparent from this description. When pad 2 is operating as an output device, actuators 8 and motor 10 move pins 4 relative to surface 5 under the control of processor 12 executing program logic 14. When pad 2 is operating as an input device, the motion of pins 4 relative to surface 5 is sensed by actuators 8 and motor 10, with resistors 6 applying resistance to this motion as desired, all under the control of processor 12 executing program logic 14. Multiple pads 2 can operate in tandem or collectively, with their respective pins 4 moving in a coordinated fashion, or inversely, or independently in response to instructions from program logic 14, to counter pressure applied to pins 4, to manage resistance to a force threshold, to convey a geometric plane of orientation, or to function remotely over a wireless network connection.

According to some embodiments of this invention, pad 2 is implemented with a portable enclosure 3 defining a geometric plane of surface 5 from which pins 4 apply physical force in response to digital data, or receive physical force for digitization and communication, or both. Collections of physical and virtual pads 2 of different design, scale, and positioning, managed by computers in a wide range of distributed force applications, may be provided.

As suggested by FIG. 1a and described above, pad 2 may be implemented in a standalone manner, with pins 4 available to interact with objects with which it is in contact, or in response to programming logic 14. For example, pad 2 could be used as a leveling platform that self-adjusts based upon pressure applied to its pins 4. FIG. 2a illustrates another example of an implementation of pad 2, in which it is connected to portable computing device 16, such as a smart phone or tablet. In some implementations, pad 2 may be deployed on the back surface of portable computing device 16 itself. In the example of FIG. 2a, pad 2 is pressed against and rotated around an object O to create a three-dimensional spatial image. A high definition picture is taken with a camera of computing device 16, and overlaid by computing device 16 onto the spatial image to create a virtual duplicate of object O.

FIG. 2b illustrates one option for pairing pads, in which two physical pads 2 are connected to one another over a network link. Pad 2a operates as a sender, and as such affects the environment of pad 2b operating as a receiver, with as much force as permitted by the receiver pad 2b. The reaction at receiver 2b is in turn sent to sender 2a, which in that case becomes a receiver and is likewise affected. By quickly alternating control, users of pads 2a, 2b can engage in asynchronous force feedback. While FIG. 2b shows pads 2a, 2b as having about the same size (and presumably strength) relative to one another, pad 2b can be constructed at a different scale from its paired pad 2a, having a different size, or a different force capability, or both. Such scaled paired pads 2 could, for example, enable the user working on a small pad to affect the force of a much larger pad against a large object.

FIG. 2c illustrates another option in which physical pad 2 is paired with a "virtual pad" executed by computer 17. Interestingly, from the perspective of physical pad 2, there is no distinction between connecting to a physical or virtual pad. In the case of a virtual pad residing and operating on computer 17, this virtual pad becomes capable of broad, complex program logic to control exchanges across multiple pads 2 concurrently.

FIGS. 3a through 3c illustrate various options for the positioning of paired pads 2. In FIG. 3a, three pads 2a through 2c are placed in close proximity. Pads 2a and 2b share a common geometric plane and could be physically connected to share components, such as power source 11, interface 15, motor 10, and the like. Pad 2c is in close proximity to pad 2b, but does not share the same geographic plane; distance or orientation may limit options for sharing components between pads 2b, 2c. Many potential applications are contemplated for paired pads 2 that are positioned in close proximity. For example, paired pads 2 could be used to create a larger pad with a common geometric plane, or if not in a common plane, could be wrapped about a surface to create a larger pad of irregular geometric planes.

Pads 2 that are placed in close proximity such as shown in FIG. 3a may share a number of components, while other components are typically not shared:

| Potentially shared | Not shared |
|---|---|
| Power source 11 | Components of pins 4 (pin shells, screws, worm gears, worms) |
| Motor 10 (and distribution) | |
| Processor 12 | |
| Memory 13 | |
| Program logic 14 | Actuators 8 |
| Network interface 15 | Circuit connectors |
| Gyroscope 9 | Resistors 6 |
| Support structure | Support structure |

FIG. 3b illustrates paired pads 2a, 2b, positioned back-to-back. In this case, each of pads 2a, 2b are able to leverage the force of the other, for example to wedge an opening or apply opposing pressure to an enclosed surface. FIG. 3c shows two pads 2a, 2b set in opposition to one another, to enable interaction of each pads 2a, 2b with the force from the other, or to handle objects placed between them, such as to apply a robotic grip. In FIG. 3d, paired pads 2a, 2b, 2c are overlaid, or layered, in the same orientation. This layering of pads 2a through 2c allows top pad 2a to be extended even further from its surface; in addition, layered pads 2a through 2c can expand to fill a variable gap, with top pad 2a providing more precise management.

The processing of intervals can be grouped and or aggregated, and the frequency of exchange of pad data between paired pads 2a, 2b, etc. may be adjustable. For example, depending on the size of each pad 2, the available bandwidth, and the particular application, it may be necessary to collect group sets of intervals of data for a single pad 2 before sending or processing.

When paired with another pad, the following data are collected along with intervals of pad data:
  Pairing Id—uniquely identifies a pairing session between one or more pads.
  Pairing Date/timestamp—date and time a pairing is initiated.
  Pairing Order—numeric value that indicates the order in which pads joined the pairing, the initiating pad is 1 and subsequent pairings are 2, 3, etc.
  Reference Template Id—uniquely identifies a grid layout of a pad's pin arrangement.
  White Space—the contiguous space between mapped pins considered inoperable. Note: When pads ads are positioned side by side, this value is equal for an entire row or column of pins The grid layout of the reference template matches the row and column pin arrangement and/or geographic orientation of the pad that initiates the pairing. When additional pads are paired, their pins are mapped to the reference template of the original pairing. The template provides a method to map pin arrangement of paired pads to allow for different pin arrangements, level of magnification, scale, or orientation. For example, a pad with less pins or higher magnification would cross reference a smaller set of pins to the same reference template. Another example would be where compass orientation takes precedence over pad orientation.

Depending on the application, paired pads can be mapped with several options including:
  Same or inverted pins
  Same or inverted plane
  Same or symmetrical pins
  Same size or different scale pins
  Same or different range of pin extension and/or retraction FIG. 4a illustrates one example of the operation of paired pads 2a, 2b in effecting pin adjustments. In this example of paired operation, external pressure sufficient to overcome the resistance of resistor 6 is applied to the surface of pin 4a of pad 2a. As a result, pin 4a is refracted an increment of "$-\Delta z$". Processor 12 of pad 2a acquires an interval of pad data corresponding to that translation of pin 4a via program logic 14, and sends a data packet to the paired 2b over the network or other connection between pads 2a, 2b. Pad 2b receives the data packet, and its processor 12 executes the operations of: i) identifying the specific pin or pins of pad 2a that moved, and maps that identified pin 4a to its own grid reference layout of pins 4 to identify its corresponding pin (pin 4a' in this example); ii) evaluating the change $-\Delta z$ in the position of that pin 4a relative to any constraints of its program logic 14 that may take precedence; and iii) applying the change $-\Delta z$ to the position of its pin 4a' as appropriate.

Figure 4B:
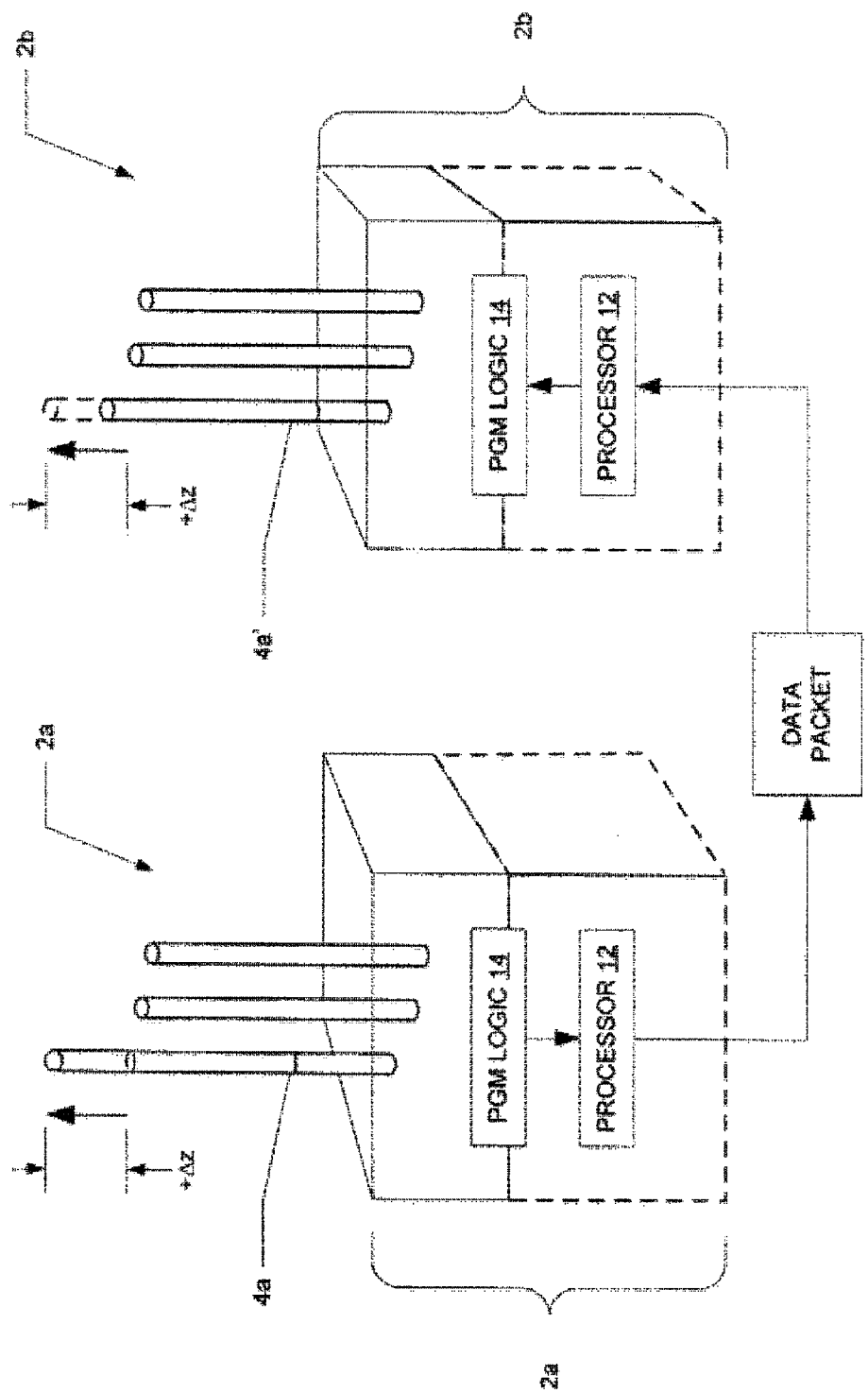

Alternatively, in another operating scenario as illustrated in FIG. 4b, program logic 14 of pad 2a initiates a command to extend pin 4a a "$+\Delta z$" increment. Pin 4a responds by extending to that extent, unless it is obstructed, i.e., if counter pressure to its pin surface is greater than the pin resistance level established by resistor 6. As in the example of FIG. 4a, processor 12 of pad 2a sends an interval of pad data via a data packet to paired pad 2b, which goes through the same steps as before but with the possibility that extension of its corresponding pin 4a' will fail if counter pressure is greater than its pin resistance level.

Further in the alternative, paired pads 2a, 2b may interact in a "push-pull" manner, in which external pressure to the surfaces of pins 4 at pad 2a are reflected by extension of corresponding pins 4' at pad 2b. Other alternative cooperative arrangements of paired pads, as evident to those skilled in the art having reference to this specification, are also contemplated.

Without real-time video, pictures, or audio, the sending pad 2a is "blind and mute" as to the effect it has on the environment at the receiving pad 2b. Even with some type of alternate sensory feedback, receiving pad 2b is best positioned to determine the allowable level of pressure that it can apply to its pins 4'. Therefore, the resistance level of a given pin 4' is the responsibility of receiving pad 2b. Depending on the application and capabilities of the embodied device, receiving pad 2b can delegate the responsibility of setting resistance level to sending pad 2a, in which case, pins 4' of receiving pad 2b could extend with full pressure capability.

As evident from these examples, haptic device, or pad, 2 according to embodiments of this invention can serve as a stand-alone interface device with its own self-contained computing resources, or as a peripheral device to a computer system or network, or as a hybrid thereof (depending on the computing capability of the pad device itself). In its various realizations, the pad can serve as an input device for receiving or sensing physical stimuli, as an output device presenting output signals in a physical form (force, position, etc.), or as both (i.e., capable of both receiving physical input stimuli and also presenting physical output information).

According to embodiments of this invention, and as mentioned above, the components of pad 2 are controlled through mechanical and digital means. For example, an embodiment could include a spring with an adjustment gear near the pin which determines the resistance level, or, a processor that signals actuators to engage the motor and motor mechanisms and extend the pins.

It is contemplated that various embodiments of pad 2 are possible using a variety of means including electric, hydraulic, pneumatic, or magnetic. The main design considerations are application specific, such as, size of pad profile, length and pressure strength of pins, processor performance, and counter pressure management. The following description will elaborate on the construction of pad 2 according to a preferred embodiment of the invention, by way of an example of pad 2 as intended for general use, and which may serve as a model for the construction of variations of pads for specific applications. Some design options for this preferred embodiment and various alternative embodiments will also be described.

As mentioned above, pad 2 includes one or more pins 4 that extend or refract, or either, in a common, consistent, and predictable method from a single geometric plane defined by pad surface 5. The particular form of pin 4 need not be the same above and below pad surface 5; for example, a pin shell could be lifted or inflated. Specifically, in this case in which pad 2 is a pneumatic device, the pin shell may be made of a stretchable material, which can be colored or clear, and is inflated above the pad surface to a volume greater than the pin shell in its deflated state. When retracted, i.e., deflated, the pin shell can collapse into a space that is less than that required for a rigid shape shell design. In such an arrangement, the deflated shell is stored below pad surface in such a way that it can be extended, i.e., inflated, in a consistent, predictable manner. Other realizations of the pins such as those in which water, foam, or any other type of malleable substance that can be made to selectively flow in and out of the pin shells by a pneumatic, hydraulic, or other type of drive mechanism are also contemplated in connection with this invention.

Figure 5B:
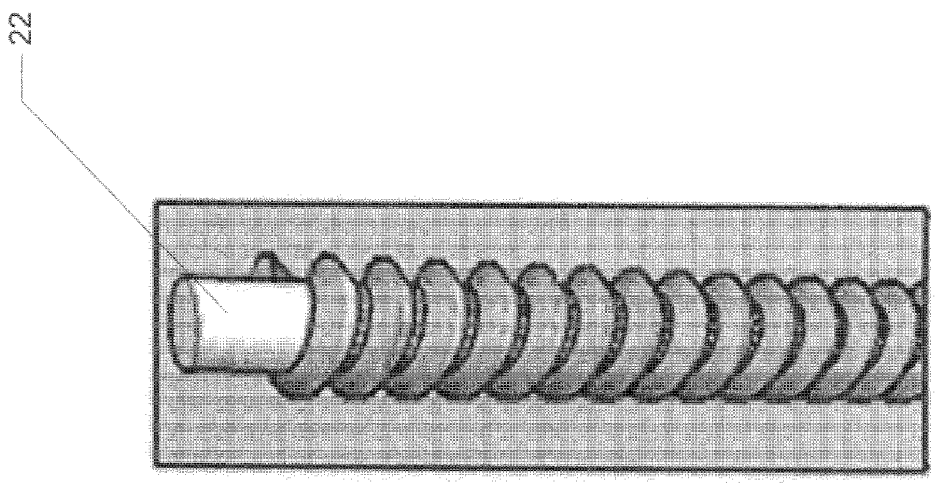
FIGS. 5a and 5b are perspective views of the construction of a pin in a device constructed according to embodiments of the invention.
Figure 5A:
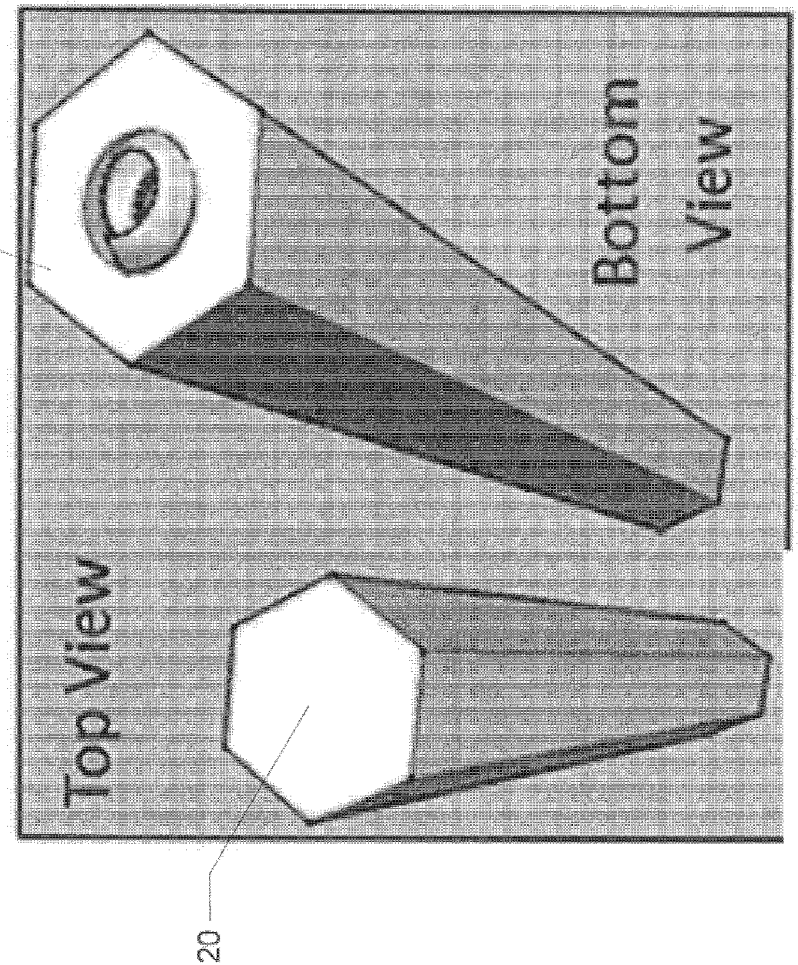

FIGS. 5a and 5b illustrate the pin components for the preferred embodiment. In this case, pin 4 is comprised of pin shell 20, shown in FIG. 5a, and pin screw 22, shown in FIG. 5b. In this example, the form of pin 4 is the same above and below pad surface 5. Each pin shell 20 is a rigid or semi-rigid, hexagon rod that is internally grooved to extend and retract vertically relative to the pad surface when the pin screw is rotated. Pin screw 22 is a straight, screwed rod with a threaded bottom to connect to a pin motor gear, which will be described below. The glide path of pin shell 20 will be restricted at multiple contact points with other pad components, including pin screw 22, the sides of other pin shells 20, and the inner border edge of the pad support structure (described below). In this example, pin shells 20 are of a hexagon shape, so that pin shells 20 in the pin grid array will fit tightly together and, bounded by a pad support structure, will create a contiguous, stable pad surface 5 along a single geometric plane. In this embodiment of the invention, all pin shells 20 are extended and retracted by a single common motor mechanism, but will be independently engaged by actuators 8 and resistors 6.

To allow for easy replacement or repair, pin shell 20 is designed to be lifted off of its pin screw 22 when fully extended. If pad 2 is held level to the ground, gravity will hold pin shell 20 in place, as its pin screw 22 preferably has sufficient unthreaded length at its top that pin shell 20 will sit on pin screw 22. To keep pins 4 from inadvertently falling off, program logic 14 can allow a maximum value of the data value for the Pin Extended Height field only when gyroscope 9 is indicating an appropriate angle to the ground, or when the user intentionally overrides a default established by program logic 14.

To replace an individual pin shell 20 that has been removed, a new pin shell 20 can be placed on the available pin screw 22 and then retracted. As the new pin shell 20 is refracted, it will be held in position by other pin shells 20, and by the border of the pad enclosure 3 or pad support structure. When pin shell 20 is fully refracted, it will make contact with a support platform, and motor mechanism 10 will be disengaged from that pin 4.

To replace all pin shells 20 at once, a storage casing may be used. One side of this casing would be empty, while the other side would holds a new set of pin shells 20 arranged in an array. Once the old pin shells 20 have been discharged to the empty casing, the storage unit may be turned over and pin screws 22 of pad 2 can then pick up the new set of pin shells 20, and simultaneously retract all pin shells 20 into position.

The distal ends of pins 4 establishing surface 5 of pad 2 can be colored and textured in a variety of ways, if desired. Many reasons for changing the color of the pin surface, ranging from personal preference to purposeful application, are contemplated; examples include glow in the dark, custom coloring or imaging, visual clue for a game that scores based on activity in a certain part of the pad, and the like. It is contemplated that the distal end surfaces of pins 4 in the array may be colored in the pattern of a picture. In addition, if the function of pad 2 is to portray a three-dimensional image, such as the face of a human or an animal, pins 4 may be selectively extended to lend the third-dimension to the picture depicted at the distal end surfaces of pins 4.

In the alternative, pad surface 5 may be constructed from a single, elastic covering, such as a single piece of plastic that is selectively inflated to create individual pin shells. This pad surface can also be colored. In this alternative, the entire surface would be replaced, and the pin form is different above and below the pad surface. One implementation of this alternative would be as a pad surface plate, upon which the elastic covering would extend; apertures in the pad surface plate would constitute the locations of the "pins", i.e. in the form of "pin shell apertures", which would be formed by the local inflation of the elastic covering at selected ones of those pin shell apertures. A similar implementation would combine the pad surface plate and pin shells into a single sheet, with the pin shells being locally more elastic and responsive to inflation. In either implementation, the motive force for the pins would be provided by a pneumatic drive that selectively exerts air pressure at the desired pin shell apertures to extend the elastic covering at that location; the elastic nature of the sheet would operate to retract at locations at which the pressure is not exerted. Two key advantages of this alternative would be a low profile of pad support structure, for example on the order of ⅛", and transparency of the pad surface, for example allowing it to be overlaid onto the screen of a separate computing device. Further in the alternative, pad surface 5 may be constructed from a single, elastic covering that extends over the surface of pin shells 20, which are extended and retracted by corresponding pin screws 22 as described herein; the elastic covering would result in a smoother surface for pad 2.

As mentioned above, pad 2 according to embodiments of this invention includes motor 10 for extending or retracting pins 4. For pins 4 constructed as described above in connection with FIGS. 5a and 5b, each pin shell 20 and pin screw 22 is associated with a corresponding pin worm gear 24, as will now be described with reference to FIGS. 6a through 6d. As shown in FIGS. 6a and 6b, pin worm gear 24, 24' is constructed from shaft 26 on which two gears 25L, 25R are mounted, gear 25L being "left-handed" and gear 25R being "right-handed". FIG. 6a shows pin worm gear 24 on which gears 25L, 25R are placed close together, while FIG. 6b shows pin worm gear 24' on which gears 25L, 25R are separated; the selection between these configurations is based on design preference. In each case, the bottom of the corresponding pin screw 22 is threaded and will attach to the top of the corresponding pin worm gear 24. Gears 25L, 25R on shaft 26 of each pin worm gear 24 are cut to engage respective ones of left handed worm 27L, shown in FIG. 6c, and right handed worm 27R, shown in FIG. 6d. Worms 27L, 27R run the length of pad 2, and are arranged in upper and lower parallel rows of like-handed worms. For example, left handed worms 27L may be in the upper row, to match the top, left-handed cut gears 25L of pin worm gears 24 for pins 4 in that row.

Figure 7:
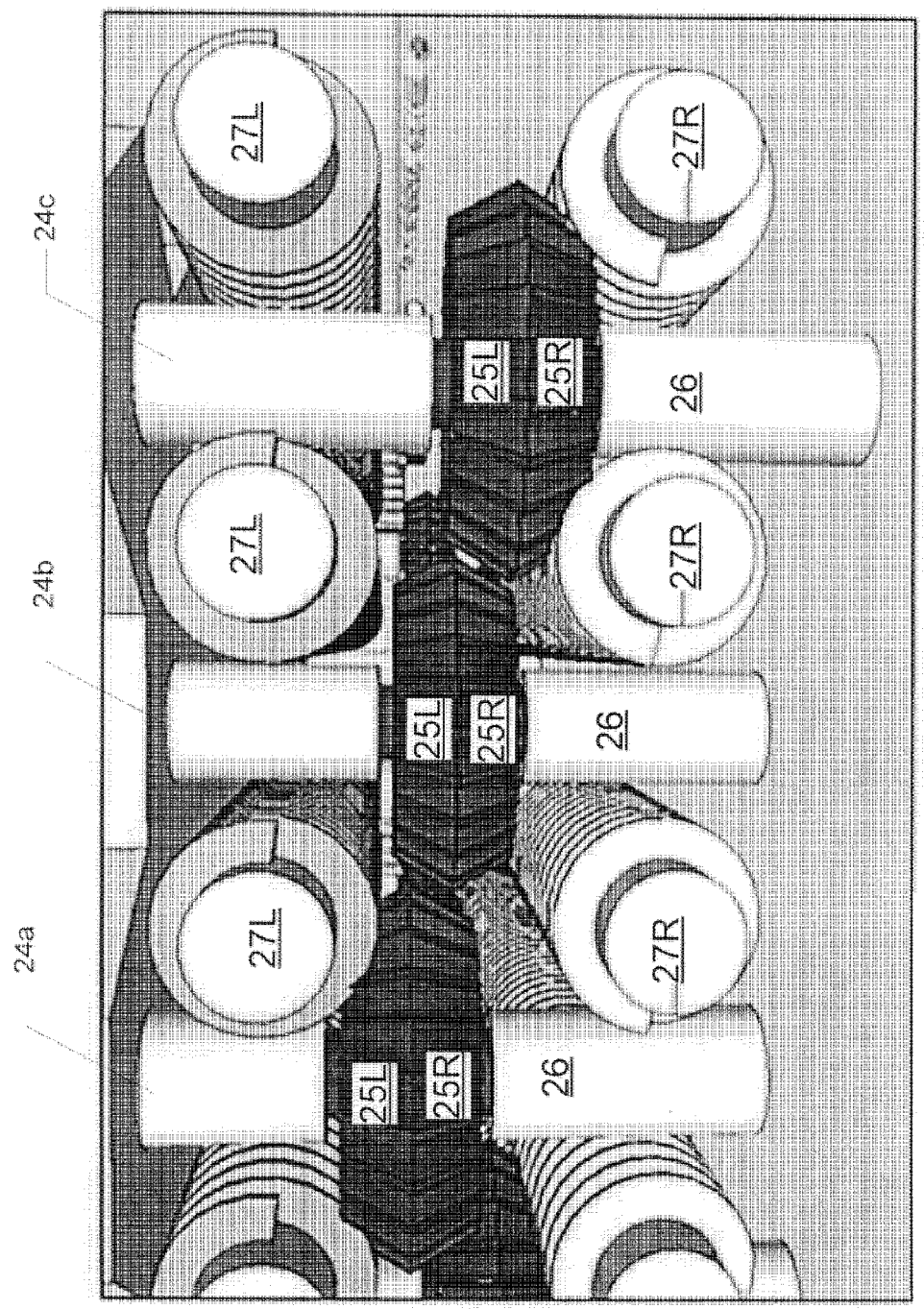
FIG. 7 is a perspective view of the coupling of pin worm gears to worms in a device constructed according to embodiments of the invention.

In operation, pin worm gear 24 for a pin 4 is moved up and down to engage and disengage the parallel levels of worms 27L, 27R. FIG. 7 illustrates a side elevation view of pin worm gears 24a through 24c. In this example, pin worm gear 24a has been raised and its gear 25L engages left-handed worm 27L for its row. Because worms 27L, 27R are rotating during operation of pad 2, the rotating worm 27L turns engaged gear 25L of pin worm gear 24a, which turns pin screw 22 to which it is connected, which in turn extends pin shell 20 for this pin 4. Pin worm gear 24c is in a lowered position and its gear 25R engages right-handed worm 27R for its row. In this position, rotating worm 27R turns engaged gear 25R of pin worm gear 24c, which turns its associated pin screw 22 in the opposite direction from that of pin worm gear 24a, and which in turn retracts its pin shell 22. Pin worm gear 24b is in a center position, and is thus neutral or disengaged, with neither of its gears 25L, 25R engaging corresponding worms 27L, 27R for its row. As such, pin worm gear 24b is not turned, and its corresponding pin shell 22 neither extends nor retracts.

Figure 8:
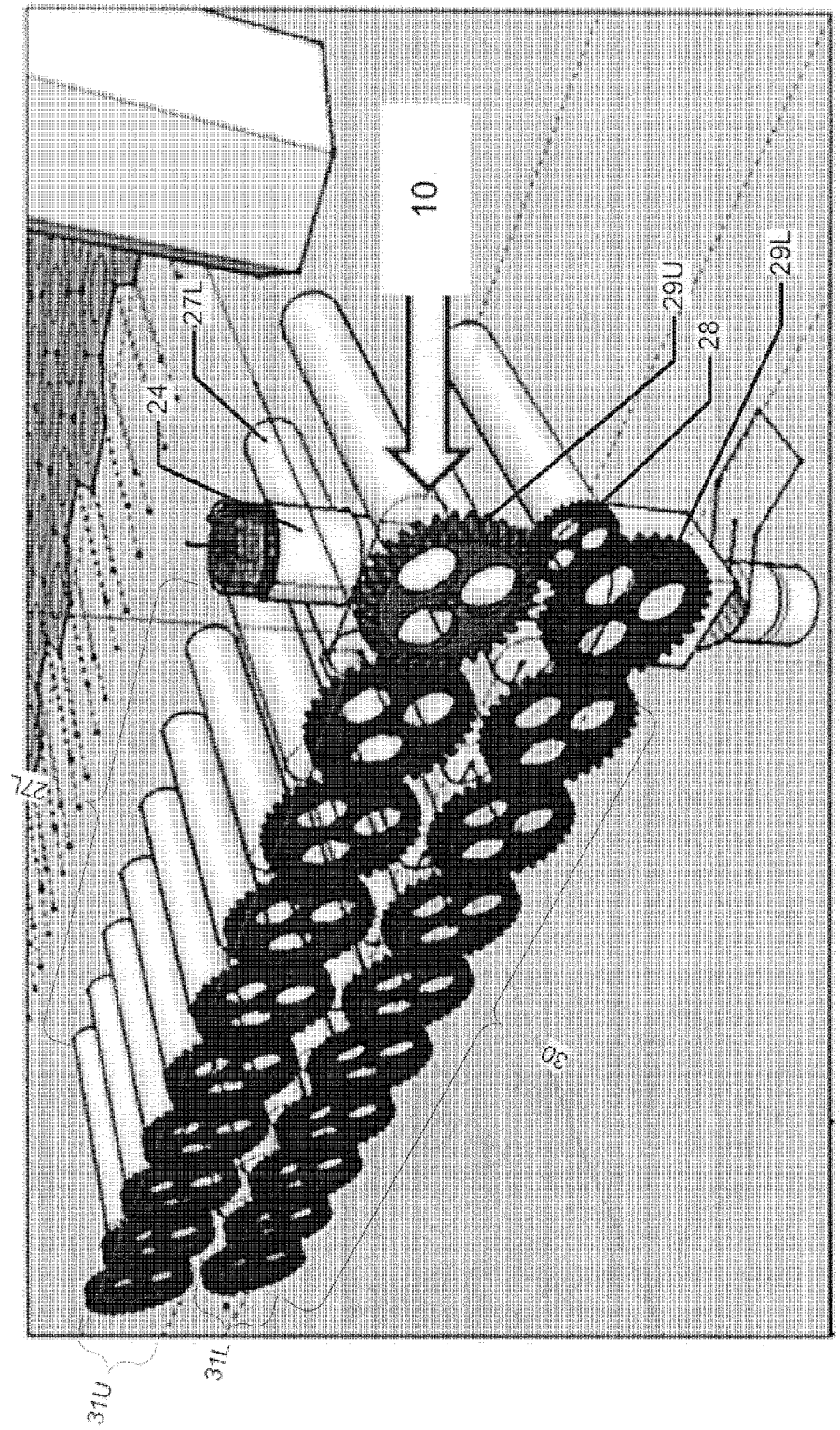
FIG. 8 is a perspective view of the motor drive subsystem in a device constructed according to embodiments of the invention.

FIG. 8 illustrates the transmission of power from motor 10 to worms 27L, 27R, according to this embodiment of the invention. Motor 10 is constructed to rotate gear 29U at its end at a constant speed and direction while pad 2 is powered on. Gear 29U is engaged with an end one of motor drive gears 30 in upper row 31U. Motor drive gears 30 in that upper row 31U are each attached to the end of a corresponding left-handed worm 27L, each gear 30 engaging an adjacent gear 30 along upper row 31U. As such, adjacent gears 30 will rotate in opposite directions from one another, alternating in direction along upper row 31U. Intermediate gear 28 is a small gear at an end of an optional intermediate drive shaft, and couples gear 29U to lower gear 29L, which in turn is engaged with an end one of motor drive geards 30 in lower row 31L of motor drive gears 30, each attached to the ends of right-handed worms 27R and each engaged 30 in with an adjacent gear 30 another in the same manner as in upper row 31L. In the implementation shown in FIG. 8 in which motor 10 drives the axial rotation of gear 29U, the coupling between gears 29U, 29L provided by intermediate gear 28 causes gear 29L to axially rotate in the same direction as gear 29U. This results in the direction of rotation of individual gears 30 in lower row 31L to be rotating in the same direction as that of the gear 30 that is directly above it in upper row 31U. Since worms 27L, 27R are like-handed within their row, the engagement of worms 27L, 27R with pin worm gears 24 will extend and retract corresponding pins 4, respectively. Alternatively, the intermediate drive shaft may be powered to rotate, either in addition to or instead of the drive applied to gear 29U.

This portion of enclosure 3 of pad 2, which contains worms 27, pin worm gears 24, and optionally motor drive gears 30, or motor 10, may be referred to as the "gear box" of pad 2. It is contemplated that this portion of pad 2 will be largely if not completed sealed within enclosure 3 to protect the functioning of the gears. When completely sealed in this manner, lubricant, coolant, or both may be introduced to improve efficiency and reduce friction damage. It may be preferable, however, to dispose the connection between pin worm gears 24 and their respective pin screws 22 outside the gear box, to facilitate detachment and replacement of pin screws 22.

Figure 9:
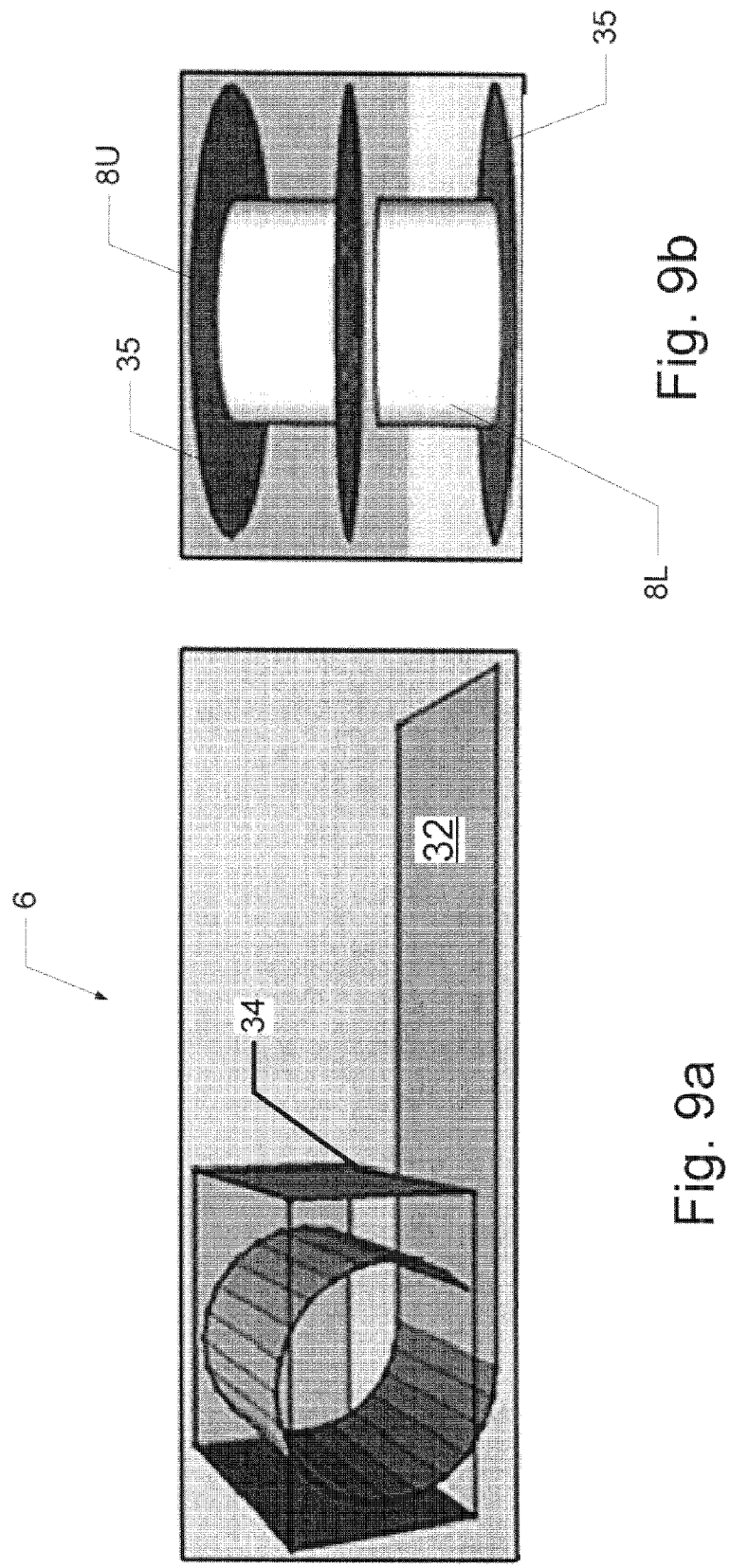
FIG. 9a is a perspective view of the construction of a resistance spring in a device constructed according to embodiments of the invention.
FIG. 9b is a perspective view of actuators in a device constructed according to embodiments of the invention.

As mentioned above, pad 2 is contemplated to also include one or more resistors 6 that establish a threshold of counter pressure in order to stop extension of pins 4, or to define the force required to cause retraction of pins 4. In this embodiment of the invention, a platform is provided within enclosure 3 of pad 2, below pin worm gears 24, for holding a resistance spring for each pin. Those resistance springs serve as resistors 6 in this embodiment of the invention. FIG. 9a illustrates the construction of an instance of resistor 6 in the form of a flat metal strip 32 having an end disposed within enclosure 34, which is a confined space located at the base of an associated pin worm gear 24, above one of two actuators 8 (not shown). In operation, the coil of metal strip 32 provides resistance when topical pressure is applied to its pin 4, or when extension of pin 4 is blocked by an external object. The end of metal strip 32 within enclosure 34 coils and uncoils as metal strip 32 moves in and out (i.e., left and right in the view of FIG. 9a). The level of resistance, which is the amount of external force required to move pin motor gear 24 to its neutral position, or to retract, is proportional to the amount of metal strip 32 that is coiled within enclosure 34. This resistance level may be modulated, or adjusted, by sliding metal strip 32 into or out of enclosure 34 (i.e., forward and backward), for example by way of a lever and gear adjustment system (not shown) under manual control or controlled by program logic 14.

Other resistance mechanisms, in the alternative to the spring arrangement shown in FIG. 9a, are also contemplated.

As mentioned above, pad 2 is contemplated to also include actuators 8 that selective engage the geared components for each pin 4, and that thus enable extension, refraction, or holding of those pins 4. According to embodiments of this invention, actuators 8 are constructed as two levels of electromagnetic disks 35 located at separate platforms positioned below resistor 6; these disks 35, which are shown in FIG. 9b, serve to engage and disengage an associated pin worm gear 24 from the extending and retracting rows of worms 27L, 27R. Alternatively, actuators 8 may be constructed as ferromagnets, springs, gears, or other mechanisms suitable for selectably moving pin worm gears 24 into and out of engagement with worms 27L, 27R. In the arrangement of FIG. 9b, actuator 8U is positioned close to, but not touching, resistance spring 6 and just above actuator 8L. When neither of actuators 8U, 8L are energized, resistance spring 6 exerts an upward pressure on its pin worm gear 24, such that its gear 25L is engaged with left-handed worm 27L in the upper layer, extending pin 4 upward relative to surface 5. When actuator 8U is energized, it attracts resistance spring 6, pulling pin worm gear 24 downward and disengaging it from the extending level of left-handed worms 27L; pin worm gear 24 is thus moved into a neutral position where it is disengaged from both levels of worms 27L, 27R. When second actuator 8L is turned on, it attracts actuator 8U, pulling resistance spring 6 further downward, which causes pin worm gear 24 to move downward from its neutral position and engage retracting worms 27R.

It is contemplated that it is preferable to apply a small electric charge to actuators 8U, 8L at all times, so actuators 8 can provide a contact feedback message to processor 12. This situation occurs when pressure to the distal surface of a pin 4 overcomes its resistance spring 6, bringing resistance spring 6 into contact with actuator 8U, or when additional pressure to the surface of pin 4 pushes actuator 8U into contact with actuator 8L. The resulting feedback message to processor 12 indicates the movement of pin 4 from extended to neutral, or from neutral to retract. When processor 12 receives this feedback message, the one of actuator 8U or 8L that provided the message is turned on to hold pin 4 in its new position.

Other actuator mechanisms, in the alternative to the electromagnetic disk arrangement shown in FIG. 9b, are contemplated.

Figure 10:
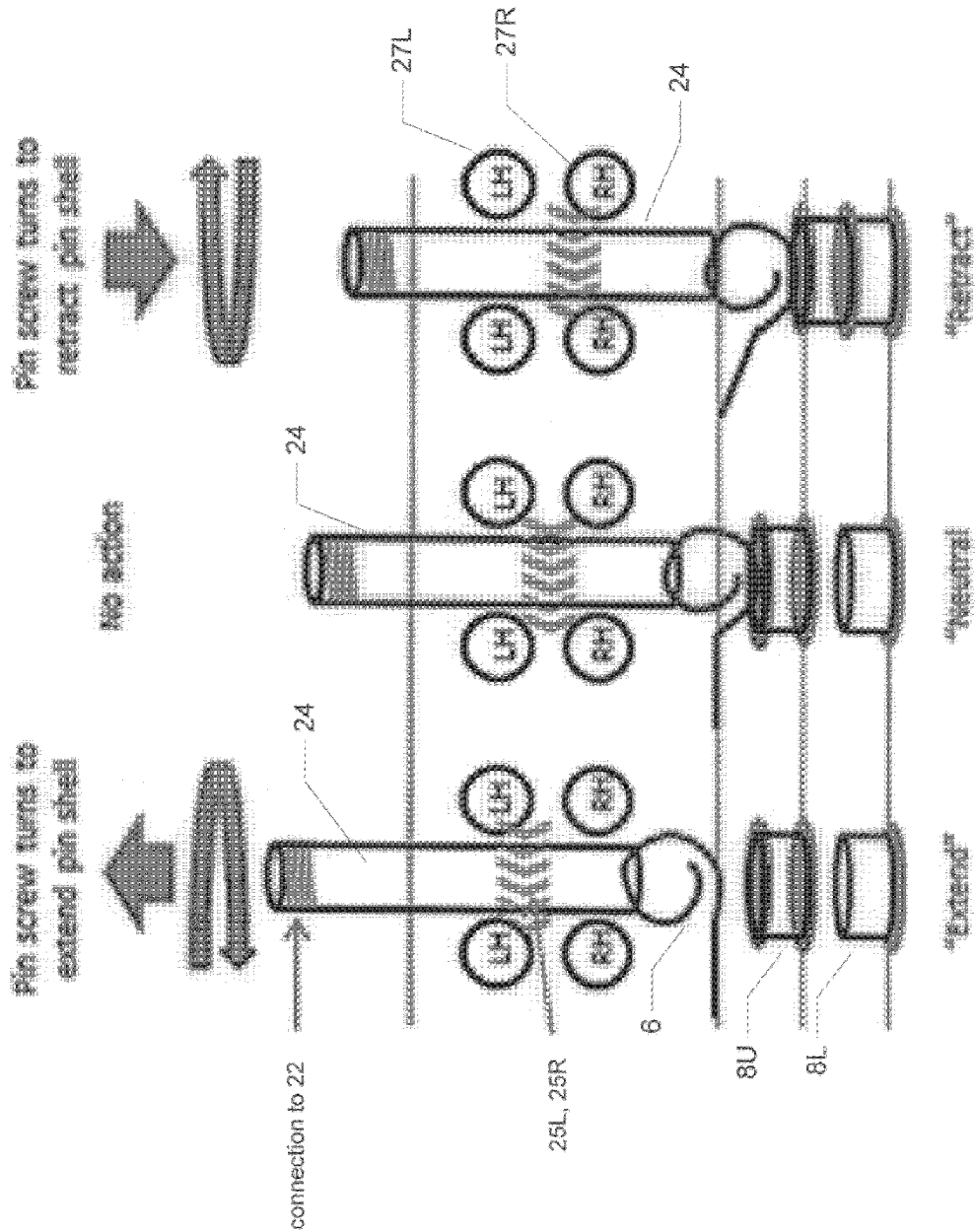
FIGS. 10a through 10c are elevation views illustrating the operation of a pin worm gear and its corresponding actuators, resistance spring, and worms, to extend, hold, and retract a pin in a device constructed according to embodiments of the invention.

FIGS. 10a through 10c illustrate the interactive coupling and operation of components in the "gear box" in extending, retracting, and holding a corresponding pin 4. As shown in FIG. 10a, the top end of pin worm gear 24 provides connection to its pin screw 22 (not shown); gears 25L, 25R of pin worm gear 24 are nominally disposed between the levels of left-handed worms 27L and right-handed worms 27R. The bottom end of pin worm gear 24 rides on the coil of resistance spring 6, as mentioned above, and actuators 8U, 8L are disposed beneath resistance spring 6.

In operation as shown in FIG. 10a, when actuator 8U is not energized, resistance spring relaxes to its uppermost position, applying upward pressure to pin worm gear 24 that engages its upper gear 25L with left-handed worms 27. The rotation of left-handed worms 27 thus turns pin screw 22 of the associated pin 4, which extends its pin shell 20 upward so that its distal end surface rises from pad surface 5. Upon pin 4 reaching its desired height, as determined by processor 12 and program logic 14, actuator 8U is energized, which attracts resistance spring 6 downward as shown in FIG. 10b. This lowers pin worm gear 24 into its center, neutral position at which neither of gears 25L, 25R are engaged with corresponding worms 27L, 27R. Pin worm gear 24 is not rotated in this position, and as such pin screw 22 is not rotated, and pin shell 20 of pin 4 remains in its current position and height, whatever that may be. To retract pin 4, actuator 8L is energized, which attracts actuator 8U to actuator 8L as shown in FIG. 10c. This movement of actuator 8U lowers resistance spring 6 even further, which in turn lowers pin worm gear 24 so that its gear 25R engages right-handed worm 27R. Pin worm gear 24 rotates in the opposite direction (relative to that of the extension position of FIG. 10a), turning pin screw 22 in that direction and thus lowering its pin shell 30. The distal end surface of pin 4 is lowered as a result. Once in its desired lowered position, actuator 8L is de-energized (with actuator 8U remaining energized), placing pin worm gear 24 in its neutral, holding, position.

Figure 11:
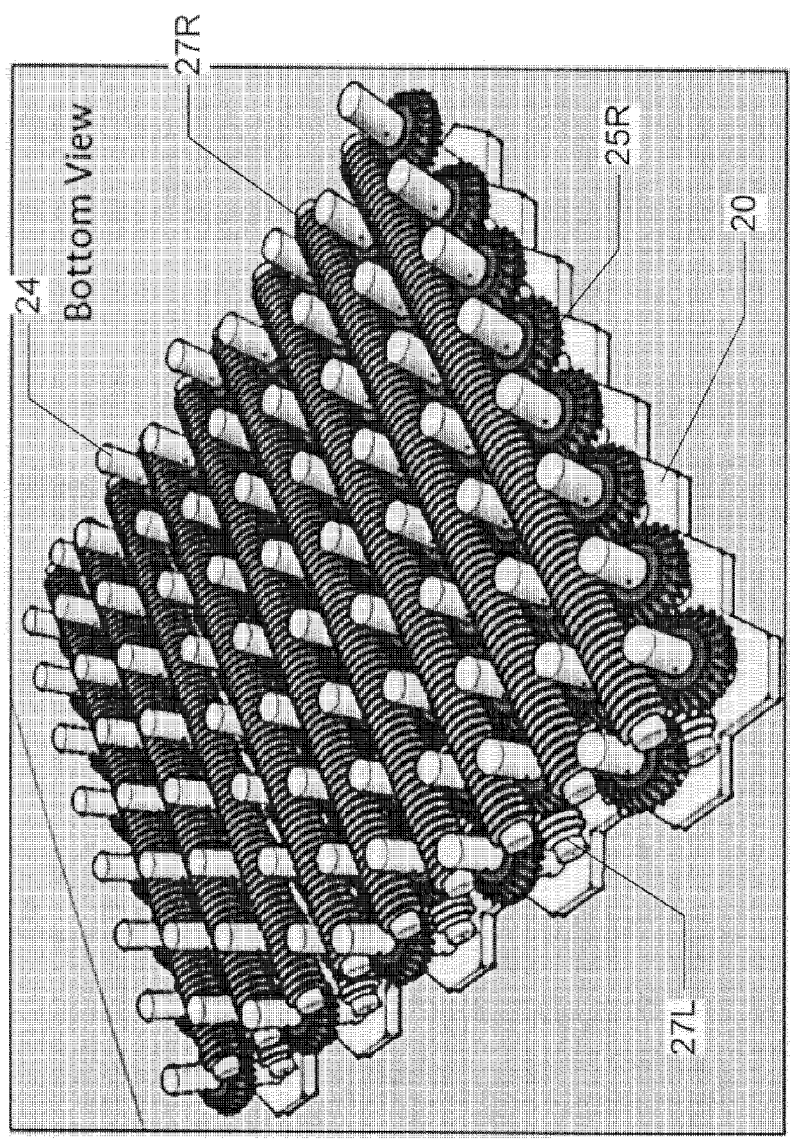
FIG. 11 is a perspective view from the underside of the gear box in a device constructed according to embodiments of the invention.

FIG. 11 is a bottom view of the gear box described above in connection with this embodiment of the invention. As evident from FIG. 11, right-handed worms 27R are visible, along with the lower-most gears 25R of pin worm gears 24. The bottoms of hexagonal-shaped pin shells 20 can also be seen along the edges of the array.

As described above in connection with FIG. 1a, the mechanical components of pad 2, including the array of pins 4, are housed within enclosure 3. In this embodiment of the invention, enclosure 3 includes a pad casing that frames and supports pins 4, and ensures a predictable geometric plane of reference at surface 5. Enclosure 3 thus ensures that pad 2 is not vulnerable to deformation that is significant enough to affect its ability to provide a predictable pad surface 5 from which pins 4 extend and retract.

Referring now to FIGS. 12 through 18, the construction of a pad casing for enclosure 3 of pad 2, according to an embodiment of the invention, will now be described. As will become apparent from this description, this pad casing will include siding and platforms that protect and support the components and configuration of pad 2, and that help ensure pins 4 perform as anticipated. In some embodiments, this pad casing may constitute enclosure 3 itself; in other embodiments, this pad casing may occupy only a portion of enclosure 3 of pad 2.

FIG. 12 illustrates siding 40 of this pad casing. As evident from FIG. 12, siding 40 is internally corrugated to serve as a frame for pins 4; additionally, this corrugation at its exterior allows siding 40 to fit tightly with other pads 2. The material of siding 40 is preferably selected to be sufficiently strong and rigid to support pad components, but as thin as possible to allow pads 2 to closely connect. Corner 41 of siding 40 has an extra amount of material, resulting from the width of siding 40 being greater than the perimeter of the array of pins 4 that it frames. In alternate designs, this excess can be optionally distributed to any part of the siding. The corner location may additionally provide optional cavity space for pad components, and facilitate easier alignment and tighter connections between adjacent pads 2.

FIG. 13 illustrates bottom platform 42 of the pad casing, which is a solid piece of the same material as siding 40 or of a compatible material. FIGS. 14 and 15 illustrate interior platforms 44, 45, each of which have an exterior perimeter matching the interior of casing 40, but which have differing cutout shapes appropriate for the pin components that pass through, depending on the locations at which interior platforms 44, 45 are disposed when assembled. In this example, the circular cutouts of platform 44 of FIG. 14 accept actuators 8 and pin worm gears 24. The rectangular cutouts of platform 45 of FIG. 15 accept enclosures 35 of resistance springs 6. In addition, interior platforms 45 may include additional cutouts to provide pathways for electronic circuits, such as power connections to actuators 8 and other electronics, as necessary.

FIG. 16 is a cutaway view of an example of pad casing 50 constructed using siding 40 and several interior platforms 44, 45. As evident from FIG. 16, bottom platform 42 serves as a floor for the pad casing, and several interior platforms 44, 45 are placed at the desired heights within the interior of pad casing 50. It is contemplated that clips, rivets, or other securing mechanisms are used to hold interior platforms 44, 45 at the desired locations within pad casing 50.

Pad casing 50 may optionally include magnetic mating capabilities. If provided, magnetic areas on the external sides of siding 40 can ensure that adjacent pads 2 connect appropriately to one another and to external objects, by using magnetic attraction to snap sidings 40 of adjacent pads 2 into position when properly aligned. While such magnetic locking may restrict options for positioning, it provides reliable placement so that pad surfaces 5 can accurately align with one another, and so that adjacent paired pads 2 can effectively share components. Magnetic locking may also be useful for securing the bottom of pad 2 to another object or another pad 2. Furthermore, it is contemplated that the surfaces at the distal ends of pins 4 may be magnetic, to provide additional functionality for pad 2. The optional installation of LEDs can provide indicators that advise users of network connectivity and status, pairing status, geometric plane orientation, and other pad functions.

As mentioned above, enclosure 3 will also house those pad components that are dedicated to pad 2, or may be shared between pads 2, and that are to be located outside of pad casing 50. FIGS. 17 through 19 illustrate examples for locating potentially shared components. In FIG. 17, enclosure 3 includes pad casing 50 within part of its interior, with an adjacent side extension 52 for housing such components as power source 11, motor 10, and the like. Enclosure 3' of FIG. 18 has pad casing 50 as its upper portion, and lower portion 54 that houses power source 11, motor 10, and other such components. And in FIG. 19, enclosure 3" houses two pads 2a, 2b. As such, housing 3" includes two instances of pad casing 50, disposed adjacent to one another and held in place, for example by magnetic areas or components as discussed above. Housing 3" also includes side extension 52 for housing power source 11, motor 10, and other components; these components within side extension 52 may be shared between pads 2a, 2b, as desired. FIG. 19 also illustrates that the outer walls of pad casings 50 include LED functionality to indicate that indicate whether pads 2a, 2b are properly paired via an active communication link. In this example, the dark shading of the border of pad casings 50 is intended to illustrate the energizing of those LEDs to indicate pairing.

Figure 20:
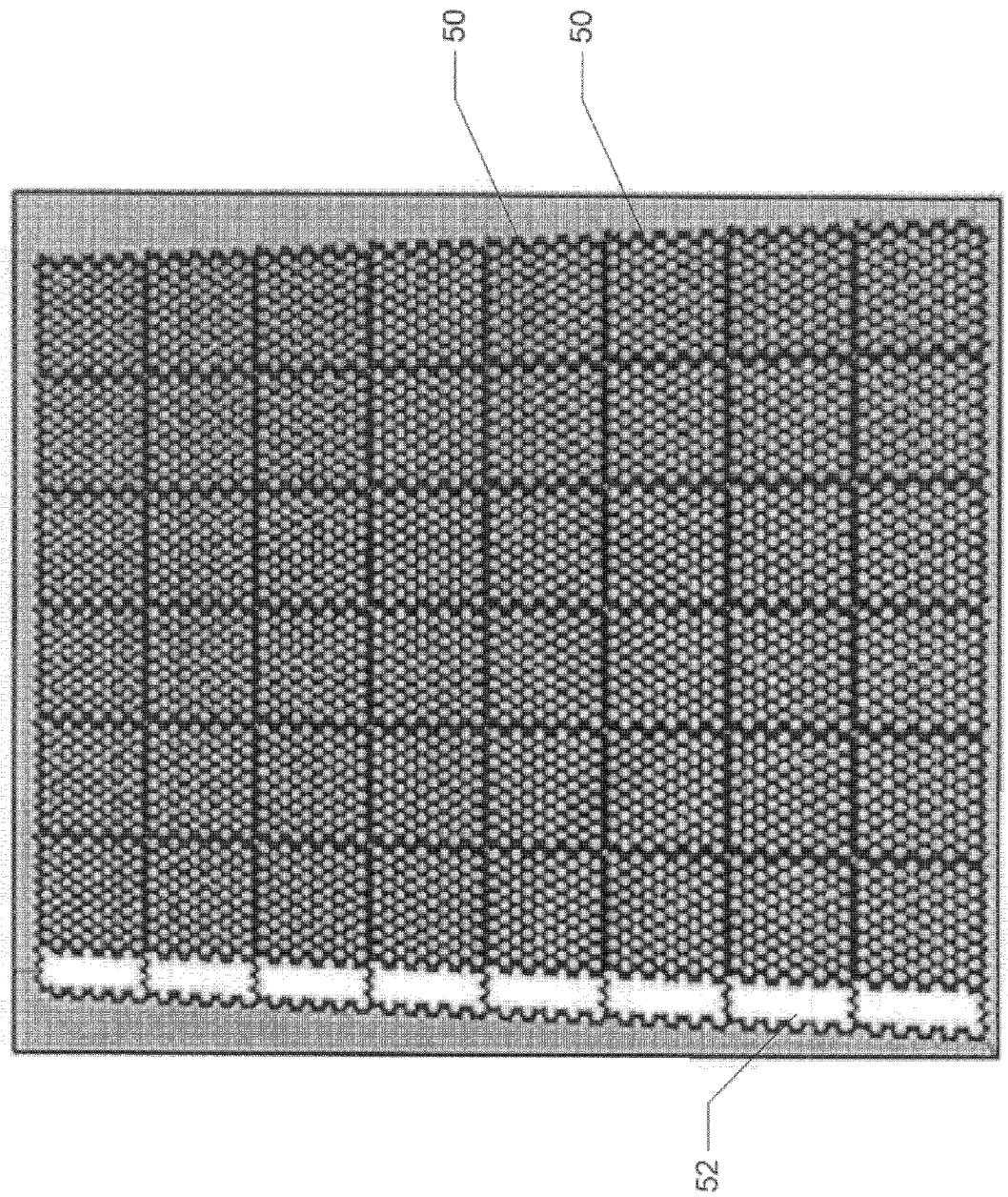
FIG. 20 is a perspective view of an arrayed arrangement of devices constructed according to embodiments of the invention.

Of course, more than two pads 2 may be paired and arranged into a single structure. FIG. 20 illustrates an eight-by-six array of pads 2, each of which are paired with one another. As evident from FIG. 20, side extensions 52 are provided along the sides of those pads 2 at the end of each of the eight rows, for housing power sources 11, motors 10, and other components for the pads 2 in its row.

Insofar as the electronic components of each pad 2 as shown in FIG. 1a, as may be shared among multiple paired pads as described above, it is contemplated that those skilled in the art having reference to this specification will be able to select, configure, and program those components to carry out the functions described in this specification, without undue experimentation.

As mentioned above, pad 2 includes the appropriate power source 11, to receive external power and to distribute power supply voltages and currents as necessary for the desired operation. The form and location of power sources 11 for pads 2 will be is based on the size and configuration of the particular application. For example, for small consumer applications, portability is a key design criteria and a battery or USB power converter would be advantageous. For large pads or large groupings of closely configured pads that are limited in mobility and higher consumers of power, it may be advantageous to use a low voltage DC power supply. In any case, it is contemplated that the appropriate power source 11 will be located near the appropriate components.

As mentioned above, pad 2 includes one or more processors 12 that issue programmed logic commands, records and communicates changes in pin position, and controls or coordinates memory 13, network connection via interface 15, and gyroscope 9. In some embodiments, a single processor 12 may be sufficient to handle all functionality of pad 2, for example by carrying out multiple functions simultaneously or in a time-splitting manner. In other embodiments, multiple physical processors 12 may be provided to perform these functions in a distributed manner. The form, capacity, and configuration selected for processors 12 in a particular arrangement is also contemplated to be based on size and configuration of the application. For example, pad designs that have its processors 12 within the same pad casing 50 as pins 4 are more flexible in pad configuration, but may be more costly to realize. It is anticipated that different profiles of processors 12 will be utilized over a range of pad applications. Depending on the specific application, processors 12 could be positioned in a variety of locations but is expected to be in proximity to power source 11 and other powered components.

In addition to a main or central processor 12 for supervising the operation of pad 2, a pin processor or processor function may be provided to track the level of pin extension or retraction at each interval of data, and to control actuators 8 by interpreting received messages and executing program logic 14. In this operation, actuator activities, combined with gear size and ratio, are used to compute the position of each pin shell 22.

A network processor may be provided in the form of a programmable device that sends and receives data packets to and from paired pads 2 and to and from external computing devices, in support the various pad configurations such as described above relative to FIGS. 2a through 2c, 3a through 3d, 4a, and 4b. These data packets can contain a range of information, such as pin position data for a pad, status of the network or network devices including other pads, and program logic commands. This information is used by processors 12, program logic 14, and memory 13 to manage pin positions in coordination with those other pads, external computing devices, and program logic 14. In a general sense, this network processor can executed generic packet processing functions such as key lookup, data bitfield manipulation, pattern matching, queue management, control processing, and management of packet buffers. A variety of physical network designs are possible depending on the application, including wired and wireless. Depending on the application, the network processor may include capabilities normally associated with routers and switches, e.g., packet or frame discrimination and forwarding, quality of service enforcement, access control functions, encryption of data streams, and TCP offload processing.

As described above, pad 2 can optionally include gyroscope 9. In this connection, a gyroscope processor or processing function is included to provide spatial reference information from which the geometric plane orientation of pad 2 can be determined. For example, as pads 2 are tilted or positioned to achieve the various configurations illustrated in FIGS. 2a through 2c, 3a through 3d, 4a, and 4b and described above, it becomes necessary to accurately track and anticipate the relative angle of pad surfaces 5 of these pads 2 throughout pin extension and retraction. For example, the effects of gravity on pins 4 that are affecting an object can be considered. As another example, it may be useful to determine in advance whether pins 4 of paired pads 2 that are at an angle relative to one another may intersect when extended. These determinations utilize information acquired from gyroscope 9 that is installed in the pad support structure. When multiple pads are positioned along a common plane, a single gyroscope 9 can be used and shared. Depending on the application, alternate embodiments can include a compass, accelerometer, and the like.

Memory 13 for supporting processors 12 for one or more pads 2 may be realized one or more various ways, depending on the architecture. For example, memory 13 may in whole or in part be integrated with processors 12, or may be separately realized on the same circuit board as the integrated circuit realizing processor 12, on detachable memory cards, or on a remote device accessible over the network, or in a combination of these implementations. The particular form and location of memory 13 may be based on the size and configuration of the application. For example, stored program logic or history of pin activity could be shared between pads 2 using a variety of methods, including, detachable storage devices, USB power/data connection, and network packet sharing. Different profiles of memory 13 are contemplated to meet a range of applications. Depending on the specific application, memory 13 could be positioned in a variety of locations and formats but is expected to be in proximity of power source 11 and other powered components.

Program logic 14 refers to program instructions executable by processor 12 or another processing function, or to hard-wired logic circuitry, or a combination thereof, for controlling the various components of pad 2. Base program logic program instructions may reside in integrated processor memory 13, and when executed will manage digital electromechanical processes, including actuators 8 and resistance springs 6. This base program logic is designed for specific input and output arrangements to support pin functions. Additional layers of program logic operate on top of the base program logic and can reside in memory that is integrated, detachable, and/or remote. Program logic 14 may be implemented in whole or in part in a separate integrated circuit from processor 12 (and memory 13), or may be realized in whole or in part in the same integrated circuit as the functions of processor 12 and memory 13.

These additional layers of program logic manage communications with the network connection and gyroscope 9, and higher level programming features, e.g., calculating mass of objects based on resistance spring response to pin surface opposing pressure, processing of priority data intervals between paired pads, recognizing patterns of objects, waking neighbor pins. In various embodiments, program logic 14 is provided to perform one or more of the functions of pin mapping, manipulation, zoom, rotate, marque, wake-pad, wake-neighbor-pad, alert state, set the pin extension/retraction range, representing different pad configurations, and the like. Other functions that may be implemented by way of program logic 14 include shape recognition, automatic sorting, and advanced operating system operations. Alternatively or in addition, program logic 14 may communicate directly (i.e., not through a network connection) to an external computer to which the pad is a peripheral, in which case further network communication can be handled by the network communication facility of the external computer itself. The additional layers of program logic 14 can be modified or appended for specific applications, and can also originate from an external control, such as program code executed from a personal computer.

As mentioned above, program logic 14 can take priority over the pad surface activities, e.g., a command to retract a pin without opposing pressure to pin surface, or, program logic can make itself subject to pad surface activity, or a command to extend a pin can fail if the resistance spring is overcome by opposing force.

According to any of the described embodiments, it is contemplated that important advantages and features of haptic devices can be provided and used over a wide range of physical applications, including the generation of three-dimensional displayed output, the manipulation of objects including in a scaled manner, gaming applications, and others. The pairing and arranging of multiple such haptic devices provides excellent scaling of this functionality, while still also providing a high resolution with the individual control of each pin. It is contemplated that other alternatives and variations on the architecture, construction, and operation described above will be apparent to those skilled in the art having reference to this specification.

While this invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A system of paired haptic devices, comprising:
a first haptic device, comprising:
   a plurality of movable pins arranged in an array, the end surfaces of the pins defining a planar pad surface with the pins in a nominal position;
   at least one motor mechanism;
   an actuator mechanism for selectably coupling each of the pins to the at least one motor mechanism to move the pin along its axis;
   a processor for controlling the coupling of selected ones of the pins to the at least one motor mechanism by the actuator mechanism; and
   a communications interface;
a second haptic device, comprising:
   a plurality of movable pins arranged in an array, the end surfaces of the pins defining a planar pad surface with the pins in a nominal position;
   at least one motor mechanism;
   an actuator mechanism for selectably coupling each of the pins to the at least one motor mechanism to move the pin along its axis;
   a processor for controlling the coupling of selected ones of the pins to the at least one motor mechanism by the actuator mechanism; and
   a communications interface;
wherein the first and second haptic devices are linked via their communications interfaces;
and wherein the first and second haptic devices are disposed relative to one another in a front-to-front positional arrangement.

2. A system of paired haptic devices, comprising:
a plurality of haptic devices, each comprising:
   a plurality of movable pins arranged in an array, the end surfaces of the pins defining a planar pad surface with the pins in a nominal position;
   at least one motor mechanism;
   an actuator mechanism for selectably coupling each of the pins to the at least one motor mechanism to move the pin along its axis;
   a processor for controlling the coupling of selected ones of the pins to the at least one motor mechanism by the actuator mechanism; and
   a communications interface;
wherein the plurality of haptic devices are linked via their communications interfaces;
wherein at least first and second ones of the plurality of haptic devices are disposed in close proximity to one another;
and wherein the planar pad surfaces of the first and second ones of the plurality of haptic devices are not coplanar with one another.

3. A haptic device, comprising:
an enclosure;
a plurality of movable pins arranged in an array, the end surfaces of the pins defining a planar pad surface with the pins in a nominal position;
motive means for selectably extending or retracting each of the pins along its axis;
a processor for controlling the motive means to extend or retract selected ones of the pins;

wherein the motive means comprises:
  at least one motor mechanism;
  an actuator mechanism for selectably coupling each of the pins to the at least one motor mechanism to move the pin along its axis;
and wherein the processor controls the motive means to extend or retract selected ones of the pins by controlling the coupling of selected ones of the pins to the at least one motor mechanism by the actuator mechanism; and
wherein the at least one motor mechanism comprises a plurality of motors.

4. The device of claim 3, wherein each of the plurality of motors is associated with a single one of the pins.

5. A haptic device, comprising:
an enclosure;
a plurality of movable pins arranged in an array, the end surfaces of the pins defining a planar pad surface with the pins in a nominal position;
motive means for selectably extending or retracting each of the pins along its axis;
a processor for controlling the motive means to extend or retract selected ones of the pins;
wherein the motive means comprises:
  at least one motor mechanism;
  an actuator mechanism for selectably coupling each of the pins to the at least one motor mechanism to move the pin along its axis;
and wherein the processor controls the motive means to extend or retract selected ones of the pins by controlling the coupling of selected ones of the pins to the at least one motor mechanism by the actuator mechanism; and
wherein the processor is programmed to compute the position of each of the at least one pins from the extension and retraction of the pin over data intervals, and from a gear size and gear ratio of the actuator mechanism.

6. A haptic device, comprising:
an enclosure;
a plurality of movable pins arranged in an array, the end surfaces of the pins defining a planar pad surface with the pins in a nominal position;
motive means for selectably extending or retracting each of the pins along its axis;
a processor for controlling the motive means to extend or retract selected ones of the pins;
  a pad surface comprised of an elastic covering overlying the end surfaces of the pins.

7. A haptic device, comprising:
an enclosure;
a plurality of movable pins arranged in an array, the end surfaces of the pins defining a planar pad surface with the pins in a nominal position;
motive means for selectably extending or retracting each of the pins along its axis;
a processor for controlling the motive means to extend or retract selected ones of the pins;
wherein the plurality of movable pins comprise:
  a pad surface plate having a plurality of pin shell apertures;
and wherein the motive means comprises:
  a pneumatic drive for exerting pressure at selected ones of the plurality of pin shell apertures.

8. A system of paired haptic devices, comprising:
a plurality of haptic devices, each comprising:
  at least one movable pin extendable and retractable along an axis, the end surfaces of the at least one pin defining a planar pad surface to which the axis is normal when in a nominal position;
  motive means for selectably extending or retracting each of the pins along its axis; and
  a processor for controlling the motive means to extend or retract selected ones of the pins;
  a communications interface;
wherein the plurality of haptic devices are linked via their communications interfaces;
and wherein planar pad surfaces of the first and second ones of the plurality of haptic devices are not coplanar with one another.

9. The system of claim 8, wherein the at least one movable pin of at least one of the plurality of haptic devices comprise:
  a plurality of movable pins arranged in an array, the end surfaces of the pins defining a planar pad surface with the pins in a nominal position.

10. The system of claim 8, wherein the motive means of at least one of the plurality of haptic devices comprises:
  at least one motor mechanism;
  an actuator mechanism for selectably coupling each of the pins to the at least one motor mechanism to move the pin along its axis;
  and wherein the processor controls the motive means to extend or retract selected ones of the pins by controlling the coupling of selected ones of the pins to the at least one motor mechanism by the actuator mechanism.

11. The system of claim 8, wherein the enclosure of each of the plurality of haptic devices comprises:
  a power source;
  a pad casing;
  a lower portion enclosing the motive means and the power source; and
  LEDs disposed in the pad casing, for indicating pairing of the haptic device with another of the plurality of haptic devices.

12. A method of operating a plurality of haptic devices, each haptic device having a plurality of movable pins arranged in an array, the end surfaces of the pins defining a planar pad surface with the pins in a nominal position, motive means for selectably extending or retracting each of the pins along its axis, a processor for controlling the motive means to extend or retract selected ones of the pins, and a communications interface linking the plurality of haptic devices, the method comprising:
  at a first haptic device, sensing axial movement of one or more of its pins;
  communicating data indicating the sensed movement from the first haptic device to a second haptic device over the communications interface;
  at the second haptic device, responsive to receiving the data indicating the sensed movement, controlling the motive means to move one or more of its pins corresponding to the one or more of the pins of the first haptic device for which movement was sensed.

13. The method of claim 12, wherein the sensed movement of one or more pins of the first haptic device is axial movement in a first direction relative to its planar surface;
  and wherein the controlling step at the second haptic device moves the corresponding one or more pins of the haptic device in the first direction relative to its planar surface.

14. The method of claim 12, wherein the sensed movement of one or more pins of the first haptic device is axial movement in a first direction relative to its planar surface;

and wherein the controlling step at the second haptic device moves the corresponding one or more pins of the haptic device in a second direction relative to its planar surface.

15. The method of claim 12, wherein the corresponding one or more pins of the second haptic device are in a similar relative position of the second haptic device as the one or more pins of the first haptic device for which movement is sensed.

16. The method of claim 12, wherein the corresponding one or more pins of the second haptic device are in a symmetric relative position of the second haptic device to the one or more pins of the first haptic device for which movement is sensed.

17. The method of claim 12, wherein the size of the second haptic device differs from the size of the first haptic device.

18. The method of claim 12, wherein the movable pins of the second haptic device have a different length than the length of the movable pins of the first haptic device.

19. The method of claim 12, wherein the axial movement sensed in the sensing step is movement of the pins as a result of external pressure.

20. The method of claim 12, further comprising:

during the step of controlling the motive means at the second haptic device to move one or more of its pins, stopping the movement of the one or more pins responsive to counter pressure at the pin surface exceeding a pin resistance level.

21. The method of claim 20, further comprising:

operating the processor at the first haptic device to set the pin resistance level at the second haptic device.

\* \* \* \* \*